US012215543B2

(12) United States Patent

Nau et al.

(10) Patent No.: US 12,215,543 B2
(45) Date of Patent: Feb. 4, 2025

(54) WINDOW FRAME ASSEMBLY

(71) Applicant: PGT Innovations, Inc., North Venice, FL (US)

(72) Inventors: Michael Dietmar Nau, North Port, FL (US); Kenneth John Vander Bent, Jr., Bradenton, FL (US); Joseph Mark Johnson, Port Charlotte, FL (US)

(73) Assignee: PGT INNOVATIONS, LLC, Harrisburg, PA (US)

( * ) Notice: Subject to any disclaimer, the term of this patent is extended or adjusted under 35 U.S.C. 154(b) by 574 days.

(21) Appl. No.: 17/538,887

(22) Filed: Nov. 30, 2021

(65) Prior Publication Data

US 2023/0167672 A1 Jun. 1, 2023

(51) Int. Cl.

| | |
|---|---|
| ***E06B 7/14*** | (2006.01) |
| ***E06B 3/06*** | (2006.01) |
| ***E06B 7/23*** | (2006.01) |

(52) U.S. Cl.

CPC .................. *E06B 7/14* (2013.01); *E06B 3/06* (2013.01); *E06B 7/23* (2013.01); *E06B 7/231* (2013.01)

(58) Field of Classification Search

CPC ..... E06B 7/14; E06B 3/06; E06B 7/23; E06B 3/4407; E06B 7/231

See application file for complete search history.

(56) References Cited

U.S. PATENT DOCUMENTS 2,787,347 A * 4/1957 Henderson ................ E06B 3/44 52/211
3,344,575 A * 10/1967 Grossman ............. E06B 3/4618 403/321
3,688,441 A * 9/1972 Rackard .............. E05D 13/1253 49/446
4,064,653 A * 12/1977 Randall ............... E06B 3/26347 49/458
4,151,682 A * 5/1979 Schmidt .............. E06B 3/26347 49/404
4,158,272 A * 6/1979 Riegelman ................. B60J 1/12 49/404
4,464,864 A * 8/1984 Yackiw ................... E06B 7/231 49/404
4,521,991 A * 6/1985 Sayer ...................... E05D 15/22 49/176
4,554,770 A * 11/1985 Anders ............... E06B 3/26347 49/458

(Continued)

FOREIGN PATENT DOCUMENTS

GB 2514213 A * 11/2014 ............... E06B 3/42

*Primary Examiner* — Phi D A

(74) *Attorney, Agent, or Firm* — Snell & Wilmer L.L.P.

(57) ABSTRACT

A lift rail and sill assembly for a window frame assembly includes a lift rail defining a lower rail end and an upper rail end, the lift rail further defining a seal retaining channel, the lift rail movable between an open position and a closed position; a seal received in the seal retaining channel of the lift rail; and a sill defining a lower sill end and an upper sill end, the sill comprising a sill ledge arranged at the lower sill end and a sill flange extending from the sill ledge to the upper sill end; wherein a gap is defined between the sill ledge and the lower rail end of the lift rail in the closed position to allow fluid to flow between the sill ledge and the lower rail end, and wherein the seal engages the sill flange in the closed position.

20 Claims, 14 Drawing Sheets

(56) References Cited

U.S. PATENT DOCUMENTS

| | | | | |
|---|---|---|---|---|
| 5,121,951 | A * | 6/1992 | Harbom | E05B 65/0876<br>49/408 |
| 6,243,999 | B1 * | 6/2001 | Silverman | E06B 3/5063<br>49/501 |
| 10,400,501 | B1 * | 9/2019 | Tatley | E06B 3/06 |
| 2008/0104892 | A1 * | 5/2008 | Cox | E06B 5/12<br>49/504 |
| 2019/0211582 | A1 * | 7/2019 | Nau | E06B 1/702 |

* cited by examiner

WINDOW FRAME ASSEMBLY

TECHNICAL FIELD

This disclosure relates to window frame assemblies. More specifically, this disclosure relates to a lift rail and sill assembly for reducing water infiltration into or through the window frame assembly.

BACKGROUND

Window frame assemblies often comprise a frame and a sash mounted within the frame. The frame typically comprises a sill having a substantially horizontal sill ledge. The sash typically comprises a lower rail, and a lower end of the lower rail confronts the substantially horizontal sill ledge. Often, a seal, such as a weather strip, is disposed between the lower end of the rail and the sill ledge to seal the lower rail with the sill. However, such seals often fail in high pressure weather conditions, such as hurricanes, and allow water to leak through the window frame assembly between the lower rail and the sill due to pressure against the window from wind and water.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a lift rail and sill assembly for a window frame assembly comprising a lift rail defining a lower rail end and an upper rail end, the lift rail further defining a seal retaining channel, the lift rail movable between an open position and a closed position; a seal received in the seal retaining channel of the lift rail; and a sill defining a lower sill end and an upper sill end, the sill comprising a sill ledge arranged at the lower sill end and a sill flange extending from the sill ledge to the upper sill end; wherein a gap is defined between the sill ledge and the lower rail end of the lift rail in the closed position to allow fluid to flow between the sill ledge and the lower rail end, and wherein the seal engages the sill flange in the closed position.

Also disclosed is a window frame assembly comprising a frame comprising a left side jamb, a right side jamb, and a sill, the sill comprising a sill ledge and a sill flange extending upward from the sill ledge; a sash comprising a left stile, a right stile, and a lift rail, the left stile slidably engaged with the left side jamb, the right stile slidably engaged with the right side jamb, the sash movable between an open position and a closed position relative to the frame, the lift rail defining a seal retaining channel and a lower rail end; and a seal received in the seal retaining channel and engaging the sill flange in the closed position; wherein a gap is defined between the sill ledge and the lift rail in the closed position to allow fluid to flow between the sill ledge and the lower rail end.

Additionally, disclosed is a window frame assembly comprising a frame comprising a left side jamb, a right side jamb, and a sill, each of the left side jamb and the right side jamb defining a jamb channel; a sash comprising a left stile, a right stile, and a lift rail, the left stile slidably engaged with the left side jamb, the right stile slidably engaged with the right side jamb, the sash movable between an open position and a closed position relative to the frame; and a sealing block is positioned within each of the jamb channels between the sill and a corresponding one of the left stile or the right stile.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
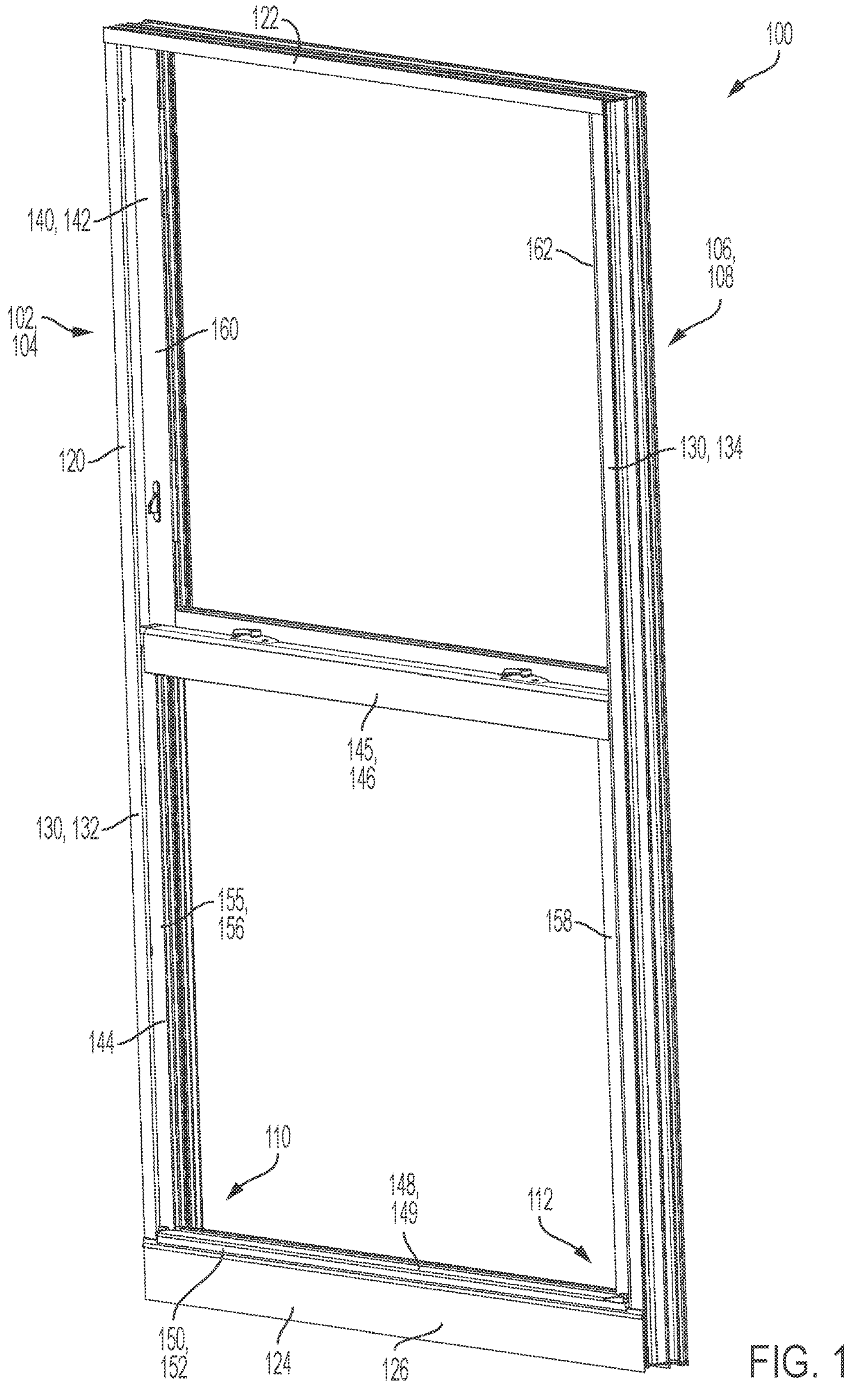
FIG. 1 is a front perspective view of a window frame assembly in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a window frame assembly and associated methods, systems, devices, and various apparatus. Example aspects of the window frame assembly can comprise a frame and a sash. The frame can comprise a sill, and a lower rail of the sash can be vertically spaced from the sill to define a gap therebetween. It would be understood by one of skill in the art that the window frame assembly is described in but a few exemplary embodiments among many. No particular terminology or description should be considered limiting on the disclosure or the scope of any claims issuing therefrom.

Figure 2:
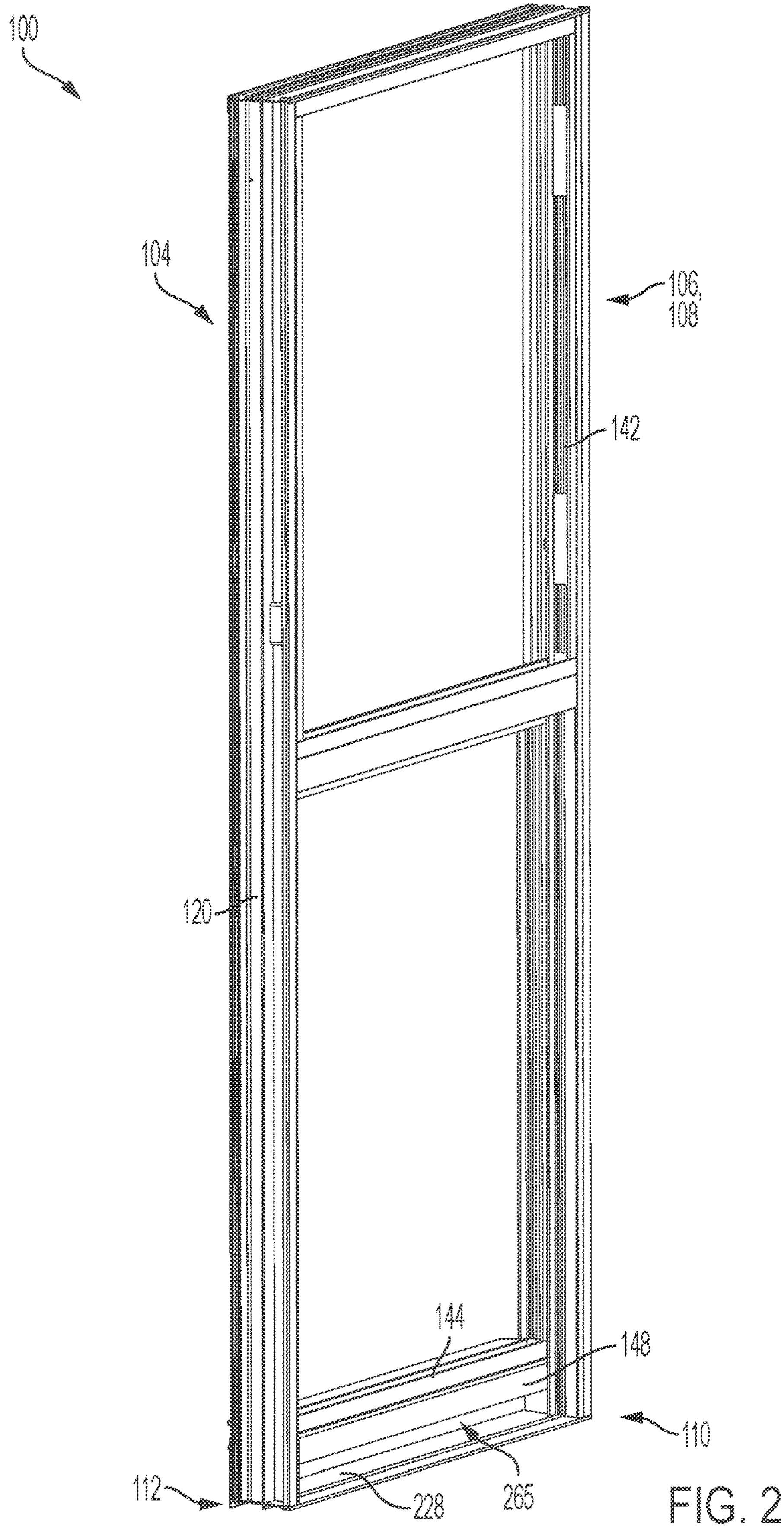
FIG. 2 is a rear perspective view of the window frame assembly of FIG. 1.

FIGS. 1 and 2 illustrate front and rear perspective views, respectively, of a window frame assembly 100 in accordance with one aspect of the present disclosure. According to example aspects, the window frame assembly 100 can define a front side 102 which can be an indoors-facing side 104 that faces the interior of a structure (such as a home, office building, or the like). The window frame assembly 100 can further define a rear side 106 which can be an outdoors-facing side 108 that faces the exterior of the structure. The window frame assembly 100 further defines a left bottom corner 110 and a right bottom corner 112. In example aspects, the window frame assembly 100 can comprise a frame 120 and one or more sashes 140 mounted to the frame 120. For example, in the present aspect, the frame 120 can comprise an upper sash 142 and a lower sash 144. The upper sash 142 can be fixed in place relative to the frame 120 and the lower sash 144 can be slidably mounted to the frame 120. The lower sash 144 can be configured for movement relative to the frame 120 between an open position and a closed position (shown). More specifically, the lower sash 144 can slide upwards and downwards along the frame 120 in a substantially vertical direction between the open and closed positions. In example aspects, the frame 120 can comprise a metal material, such as, for example, aluminum. In other aspects, the frame 120 can comprise any other suitable material or combination of materials, including, but not limited to, plastics, composites, other metals, and the like.

Each of the sashes 140 can comprise a pair of substantially horizontal rails 145, such as an upper rail 146 and a lower rail 148 disposed opposite the upper rail 146. A compressive seal 150 (e.g., a weather strip 152) can be secured to the lower rail 148 of the lower sash 144 in example aspects. In example aspects, the compressive seal 150 can comprise a foam material, such as a soft polyurethane foam; however, in other aspects, the compressive seal 150 can comprise any other suitable rubberized and/or compressive sealing material known in the art, including rubber materials for example and without limitation. A pair of substantially vertical stiles 155, such as a left stile 156 and a right stile 158, can be arranged on opposing sides of the sash 140 and can extend between the upper rail 146 and the lower rail 148. The upper and lower rails 146,148 and the left and right stiles 156,158 can define a substantially rectangular sash frame 160 in the present aspect. The sash frame 160 can define a pane opening 162 within which one or more window panes, such as glass panes, can be supported by the sash frame 160. In example aspects, the lower rail 148 of the lower sash 144 can be a lift rail 149 that can be manually engaged by a user to raise and lower the lower sash 144 relative to the frame 120 between the open and closed positions, respectively. In the closed position, the lower sash 144 can be configured to seal with the frame 120 at the left and right bottom corners 110,112 and along a length of the lower rail 148 to prevent air and fluid, such as rainwater, infiltration across the window frame assembly 100 from the outdoors-facing side 108 to the indoors-facing side 104. In other aspects, the lower sash 144 may not be movable between the open and closed positions, and can be fixed in place relative to the frame 120.

The frame 120 of the window frame assembly 100 can comprise a substantially horizontal head 122, a substantially horizontal sill 124 arranged opposite the head 122, and a pair of substantially vertical side jambs 130 extending between the head 122 and the sill 124. Example aspects of the sill 124 can be substantially L-shaped and can define a sill flange 126 and a sill ledge 228 (shown in FIG. 2). The sill flange 126 can be oriented substantially vertically and the sill ledge 228 can be oriented substantially horizontally. The sill flange 126 can be disposed proximate to the front side 102 of the window frame assembly 100 and the sill ledge 228 can extend substantially from the front side 102 to the rear side 106. The side jambs 130 can comprise a left side jamb 132 and a right side jamb 134 arranged opposite the left side jamb 132. According to example aspects, the upper sash 142 can be disposed between the left and right side jambs 132,134 adjacent to the head 122 of the frame 120, and the lower sash 144 can be disposed between the left and right side jambs 132,134 adjacent to the sill 124 of the frame 120. In example aspects, the lower rail 148 of the lower sash 144 can extend substantially between the right and left side jambs 132,134. Each of the left and right stiles 156,158 of the lower sash 144 can slidably engage a corresponding jamb channel 510 (shown in FIG. 5) of the left and right side jambs 132,134, respectively, and the lower sash 144 can slide vertically towards and away from the head 122 of the frame 120 between the open position and the closed position, respectively, to open and close the window frame assembly 100. When closed, the sill flange 126 can engage and seal with the weather strip 152 of the lower rail 148 to prevent air and water (e.g., rainwater) from passing between the lower sash 144 and the sill 124. Furthermore, each of the left and right stiles 156,158 of the lower sash 144 can engage and seal with a sealing gasket 1630 (shown in FIG. 16) positioned atop a corresponding sealing blocks 410 (shown in FIG. 4) arranged at the corresponding left or right bottom corners 110,112 of the window frame assembly 100 to prevent water infiltration at the left and right bottom corners 110,112.

In example aspects, as shown in FIG. 2, the lower rail 148 of the lower sash 144 can be vertically spaced from the sill ledge 228 when closed to define a gap 265 therebetween. The gap 265 can extend from the rear side 106 (i.e., the outdoors-facing side 108) of the window frame assembly 100 to the sill flange 228 and can extend between the left and right side jambs 132,134, such that the window frame assembly 100 is entirely open and unobstructed between the lower rail 148 and the sill ledge 228. The gap 265 can thereby allow fluid to flow between the sill ledge 228 and the lower rail 148. According to example aspects, the gap 265 can be sized to reduce rainwater retention between the sill ledge 228 and the lower sash 144 and can allow for improved drainage of rainwater out of the gap 265 on the outdoors-facing side 108 of the window frame assembly 100.

Figure 3:
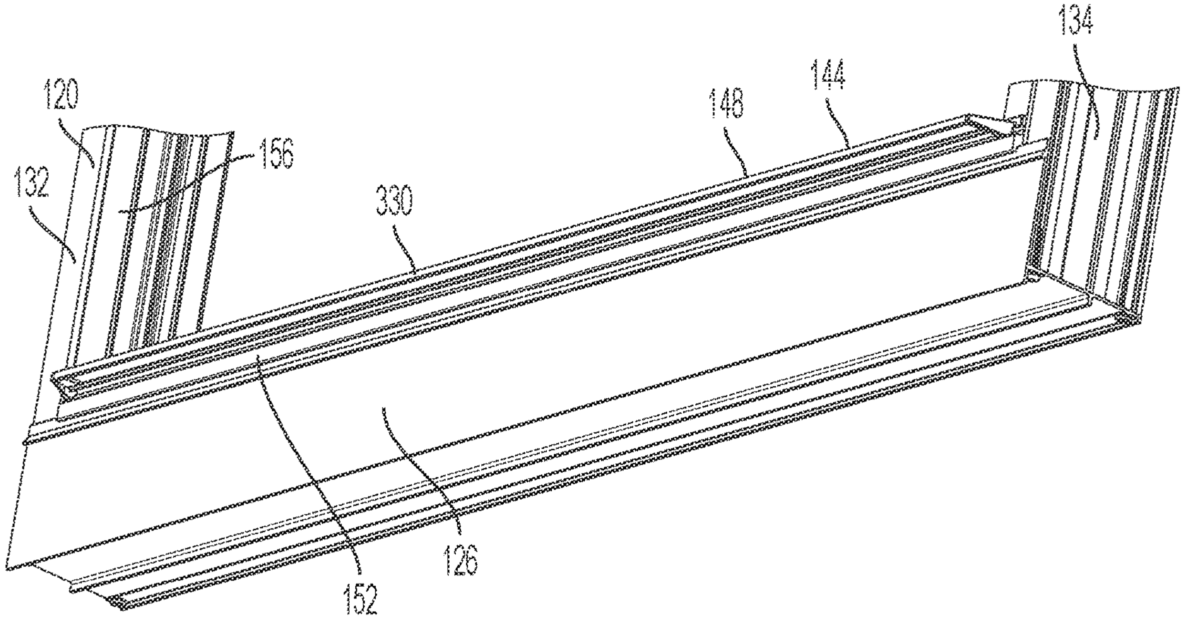
FIG. 3 is a detail front perspective view of a sill and a lower rail of the window frame assembly of FIG. 1.
Figure 4:
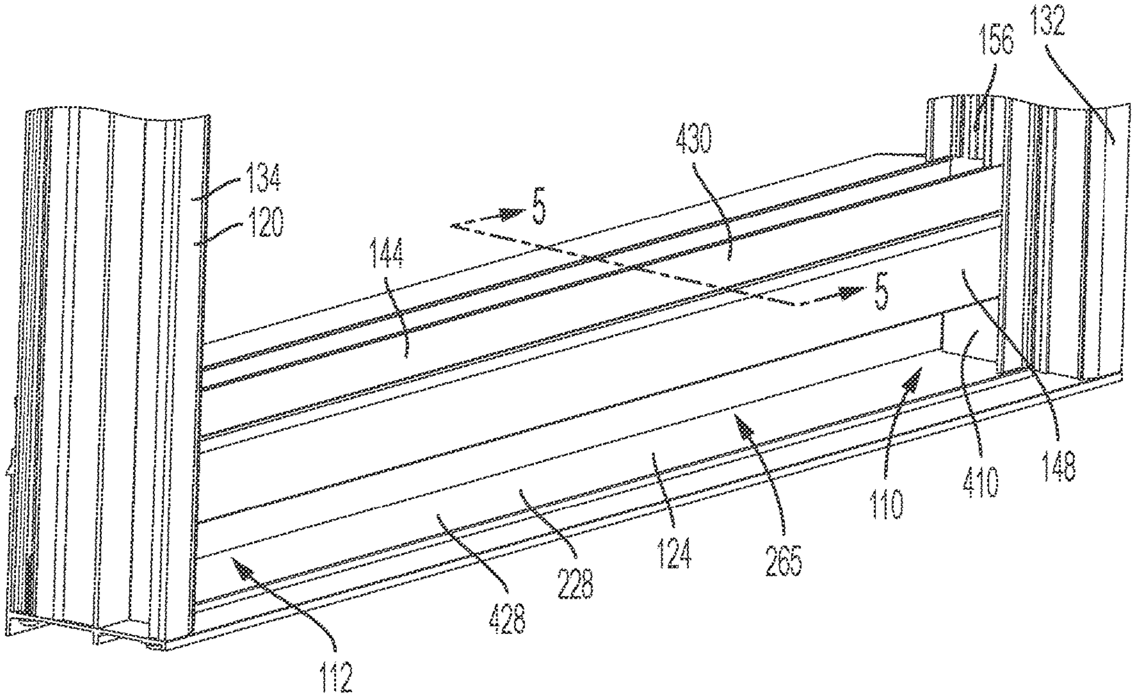
FIG. 4 is a detail rear perspective view of the sill and the lower rail of FIG. 3.

FIGS. 3 and 4 illustrate front and rear detail perspective views of the lower sash 144 in the closed position. As shown in FIG. 3, the lower rail 148 of the lower sash 144 can define a hand ledge 330 that can extend up and over the sill flange 126 and the weather strip 152. The hand ledge 330 of the lower rail 148 can provide a grip for a user to raise and lower the lower sash 144 relative to the frame 120 between the open and closed positions, respectively. The lower rail 148 can be coupled to the left and right stiles 156,158 (right stile 158 shown in FIG. 1) of the lower sash 144, and the left and right stiles 156,158 can slidably engage the corresponding jamb channels 510 (shown in FIG. 5) of the left and right side jambs 132,134. Referring to FIG. 4, one of the sealing blocks 410 can be disposed within the jamb channel 510 (shown in FIG. 5) of each of the left and right side jambs 132,134 at the corresponding left and right bottom corners 110,112 of the frame 120. The sealing blocks 410 can rest on an upper ledge surface 428 of the sill ledge 228. In the closed position, each of the left and right stiles 156,158 (right stile 158 shown in FIG. 1) of the lower sash 144 can engage and compress the sealing gasket (shown in FIG. 16) positioned atop the corresponding one of the sealing blocks 410 to seal the left and right stiles 156,158 with the sealing blocks 410. The engagement of the left and right stiles 156,158 with the sealing gaskets 1630 atop the sealing blocks 410 can limit the downward travel of lower sash 144 towards the sill 124, thereby creating the gap 265 between the lower rail 148 and the sill ledge 228. Thus, a height of the gap 265 can be about equal to a height of the sealing blocks 410 (or a height of the sealing blocks 410 plus the height of the compressed sealing gaskets 1630) in example aspects. As shown, the lower sash 144 can further comprise a lower bead 430 assembled with the lower rail 148. According to example aspects, a lower end of the corresponding window pane(s) can be sandwiched between the lower bead 430 and the lower rail 148, as described in further detail below.

Figure 5:
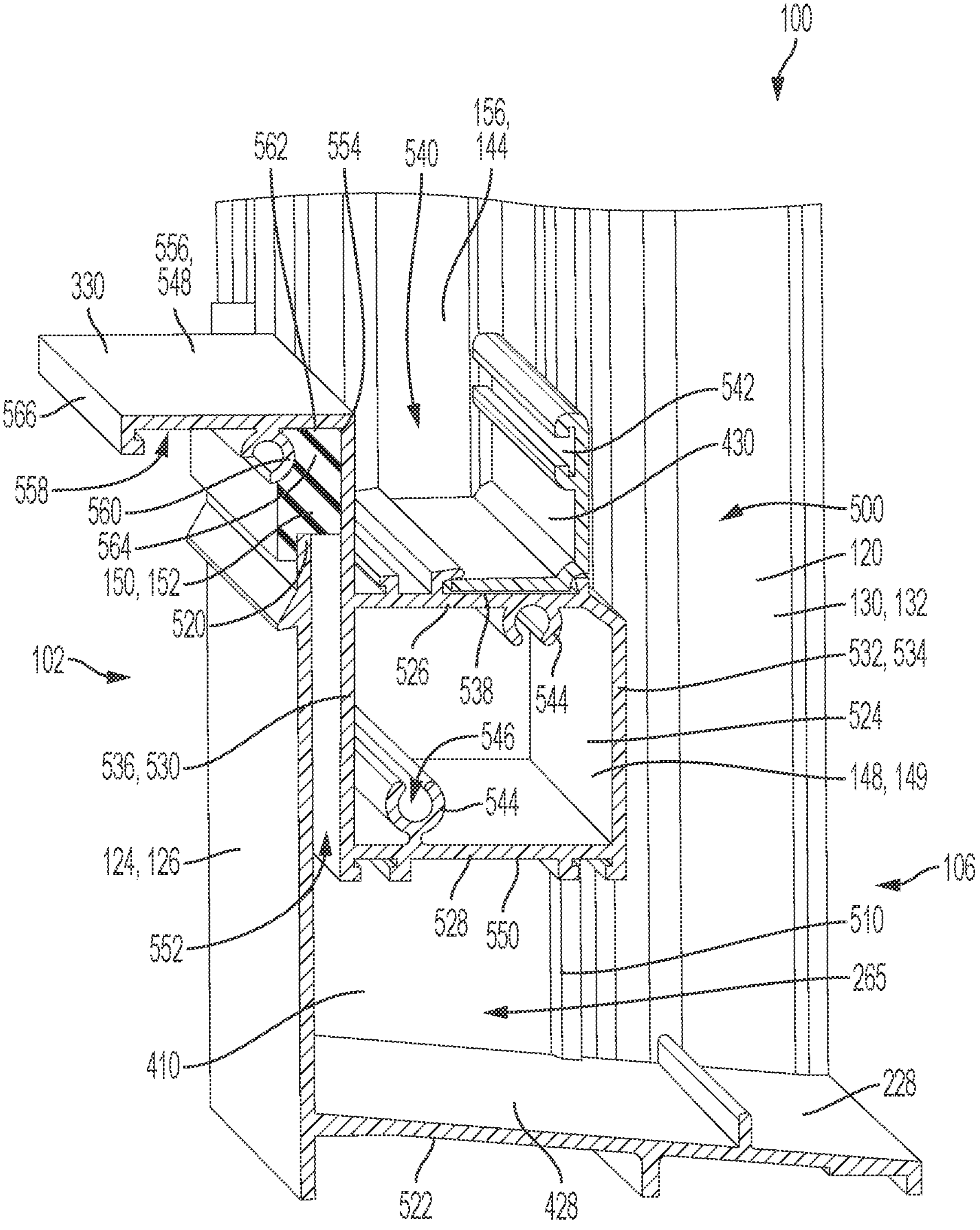
FIG. 5 is a side cross-sectional view of the sill and the lower rail of FIG. 3 taken along line 5-5 in FIG. 4.

FIG. 5 illustrates a cross-sectional view of the sill 124 and the lower rail 148 of the lower sash 144 in the closed position, taken along line 5-5 in FIG. 4. The sill 124 and the lower rail 148 can together define a lift rail and sill assembly 500 of the window frame assembly 100. Example aspects of the sill 124 can define an upper sill end 520 and a lower sill end 522. The sill 124 can be substantially L-shaped and can comprise the substantially vertical sill flange 126 and the substantially horizontal sill ledge 228. The sill ledge 228 can be defined at the lower sill end 522, and the sill flange 126 can extend upward from the sill ledge 228 to the upper sill end 520. In some aspects, as shown, the sill ledge 228 can slope slightly downward relative to the horizontal, away from the sill flange 126. The downward slope of the sill ledge 228 can facilitate the flow of water off of the sill ledge 228 and out of the gap 265. According to example aspects, the gap 265 can be unobstructed between the lower rail 148 and the sill ledge 228. One of the sealing blocks 410 can be disposed within the corresponding jamb channel 510 of each side jamb and can rest on the upper ledge surface 428 of the sill ledge 228. According to example aspects, the lower sash 144 can comprise the lower rail 148 and the lower bead 430. Each of the stiles of the lower sash 144 can be coupled to the lower rail 148 and can slidably engage the corresponding side jamb 130 to allow the lower sash 144 to slide vertically upward and downward relative to the frame 120.

Example aspects of the lower rail 148 can define a hollow, elongated support portion 524 defining a substantially rectangular cross-section. The support portion 524 can be configured to support the lower end of the corresponding window pane(s) thereon. The support portion 524 can be defined by an upper rail wall 526, a lower rail wall 528, a front rail wall 530, and a rear rail wall 532. The upper and lower rail walls 526,528 can be oriented substantially horizontally and the front and rear rail walls 530,532 can be oriented substantially vertically. The rear rail wall 532 can extend between the upper and lower rail walls 526,528 at a rear side 534 of the support portion 524. The front rail wall 530 can extend between the upper and lower rail walls 526,528 and can extend upward beyond the upper rail wall 526 at a front side 536 of the support portion 524. The lower bead 430 can be coupled to the upper rail wall 526 at or adjacent to the rear side 534 of the support portion 524. For example, the lower bead 430 can be snapped into a rail notch 538 of the upper rail wall 526. The front rail wall 530, the upper rail wall 526, and the lower bead 430 can define a substantially U-shaped pane channel 540 configured to receive the lower end of the corresponding window pane. In example aspects, the lower bead 430 can define a bead sealing slot 542 facing the pane channel 540 and configured to receive a pane seal therein. The pane seal can seal with the lower end of the corresponding window pane(s).

Figure 10:
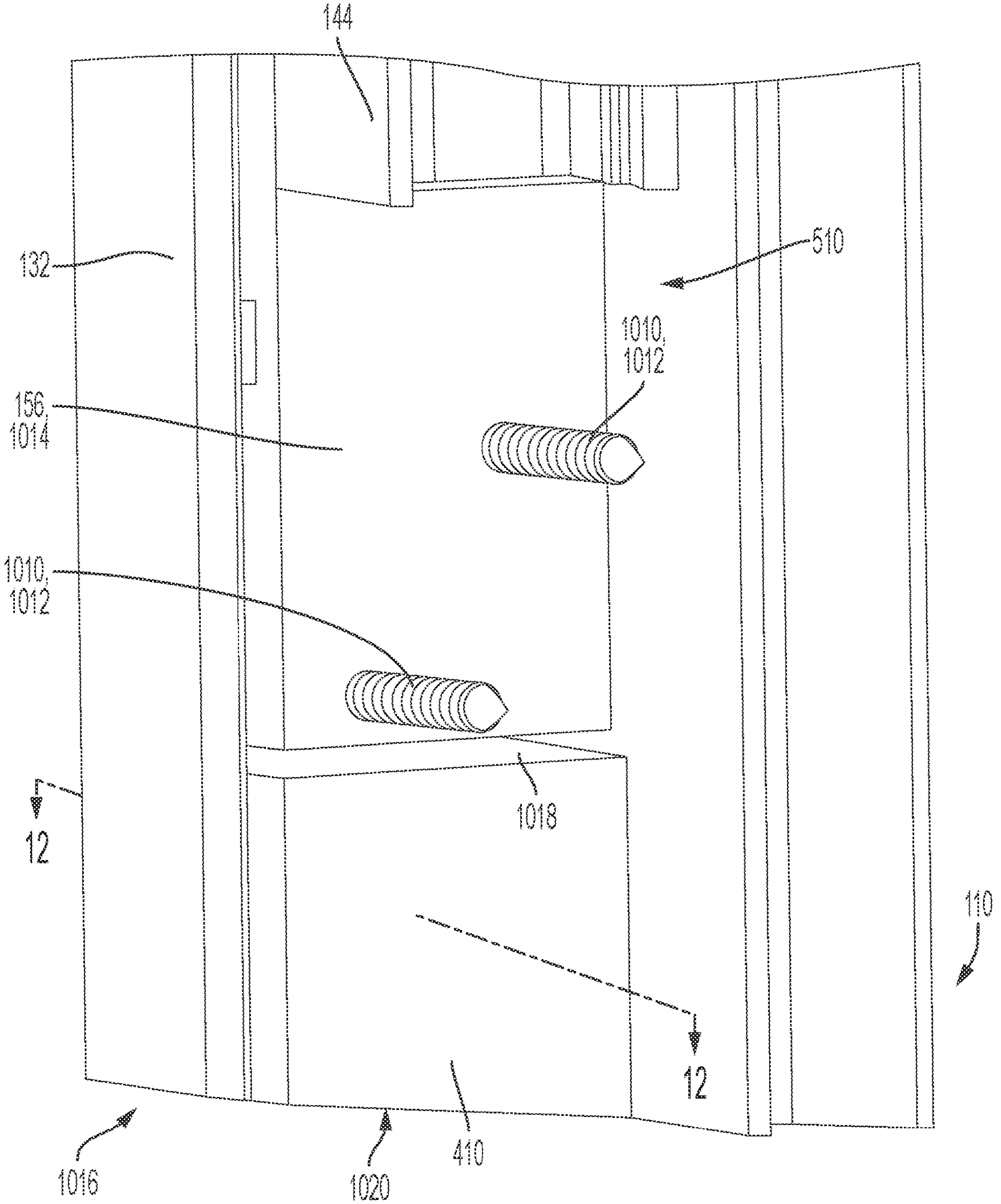
FIG. 10 is a perspective view of a side jamb of the window frame assembly of FIG. 1, wherein a sealing block is received in a jamb channel of the side jamb.

The lower rail 148 can be coupled to each of the left and right stiles 156,158 of the lower sash 144 (right stile 158 shown in FIG. 1). In example aspects, the lower rail 148 can comprise one or more substantially arcuate rail fastener ribs 544 for coupling the lower rail 148 to the left and right stiles 156,158. For example, in the present aspect, the lower rail 148 can define a pair of the arcuate rail fastener ribs 544, each extending substantially along a length of the support portion 524. Each of the arcuate rail fastener ribs 544 can define a fastener channel 546, as shown. According to example aspects, one or more stile fasteners 1010 (shown in FIG. 10) can engage the left stile 156 and one or more stile fasteners 1010 can engage the right stile 158. Each of the stile fasteners 1010 can further extend into the fastener channel 546 of a corresponding one of the arcuate rail fastener ribs 544 to mount the lower rail 148 on the left and right stiles 156,158. In example aspects, the stile fasteners 1010 can be screws 1012, as shown in FIG. 10. In other aspects, the stile fasteners 1010 can be any other suitable fastener, such as bolts or the like, and/or the lower rail 148 can be mounted to the left and right stiles 156,158 by any other suitable fastening technique, such as welding, gluing, or the like.

Example aspects of the lower rail 148 can define an upper rail end 548 and a lower rail end 550. The lower rail wall 528 can be defined at the lower rail end 550, and the gap 265 between the sill ledge 228 and the lower rail 148 can extend from the upper ledge surface 428 to the lower rail wall 528. The front rail wall 530 can extend from the lower rail wall 528 to the upper rail end 548. Moreover, the front rail wall 530 can be oriented adjacent to and about parallel to the sill flange 126. In example aspects, the front rail wall 530 can extend upwards slightly beyond the upper sill end 520 of the sill 124. In the closed position of the lower sash 144, a narrow flow channel 552 can be defined between the front rail wall 530 and the sill flange 126, as shown, which can be in fluid communication with the gap 265. Thus, fluid such as rainwater can flow between the gap 265 and the narrow flow channel 552. However, the height of the gap 265 can reduce the rainwater retention between the sill ledge 228 and the lower sash 144 and can allow for improved drainage of the rainwater out of the flow channel 552 and the gap 265, which can be particularly beneficial in extreme weather conditions, such as heavy rains and hurricanes. Furthermore, the weather strip 152 can be of suitable strength and resilience to prevent rainwater washing into the flow channel 552 from leaking across the weather strip 152. In example aspects, the height of the gap 265 from the sill ledge 228 to the lower rail 148 can be greater than a width of the flow channel 552 from the front rail wall 530 to the sill flange 126. Additionally, as shown, the gap 265 can be substantially unobstructed across a width of the sill ledge 228 from the rear side 106 of the window frame assembly 100 to the sill flange 126.

According to example aspects, the hand ledge 330 of the lower rail 148 can extend from the front rail wall 530 at the upper rail end 548. The hand ledge 330 can be oriented substantially horizontally in the present aspect and can extend over the upper sill end 520 of the sill 124. As shown, a rail corner 554 can be defined between the hand ledge 330 and front rail wall 530. Example aspects of the hand ledge 330 can define an upper handle surface 556 and a lower handle surface 558. A retaining projection 560 can extend from the lower handle surface 558 substantially along a length of the hand ledge 330. The retaining projection 560 can be disposed proximate to the rail corner 554, and a seal retaining channel 562 can be defined between the retaining projection 560 and the rail corner 554. The seal retaining channel 562 can extend substantially along the length of the hand ledge 330. At least an upper portion 564 of the weather strip 152 can be received within the seal retaining channel 562 and can be retained therein by the engagement of the retaining projection 560 with the weatherstrip, as is described in further detail below. In the closed position of the lower sash 144, the weather strip 152 can abut the sill flange 126 at the upper sill end 520 to create a fluid-tight seal between the lower rail 148 and the sill 124. Additionally, in example aspects, the lower rail 148 can further define a ledge lip 566 extending generally downward from the hand ledge 330, distal to the upper rail wall 526.

Figure 6:
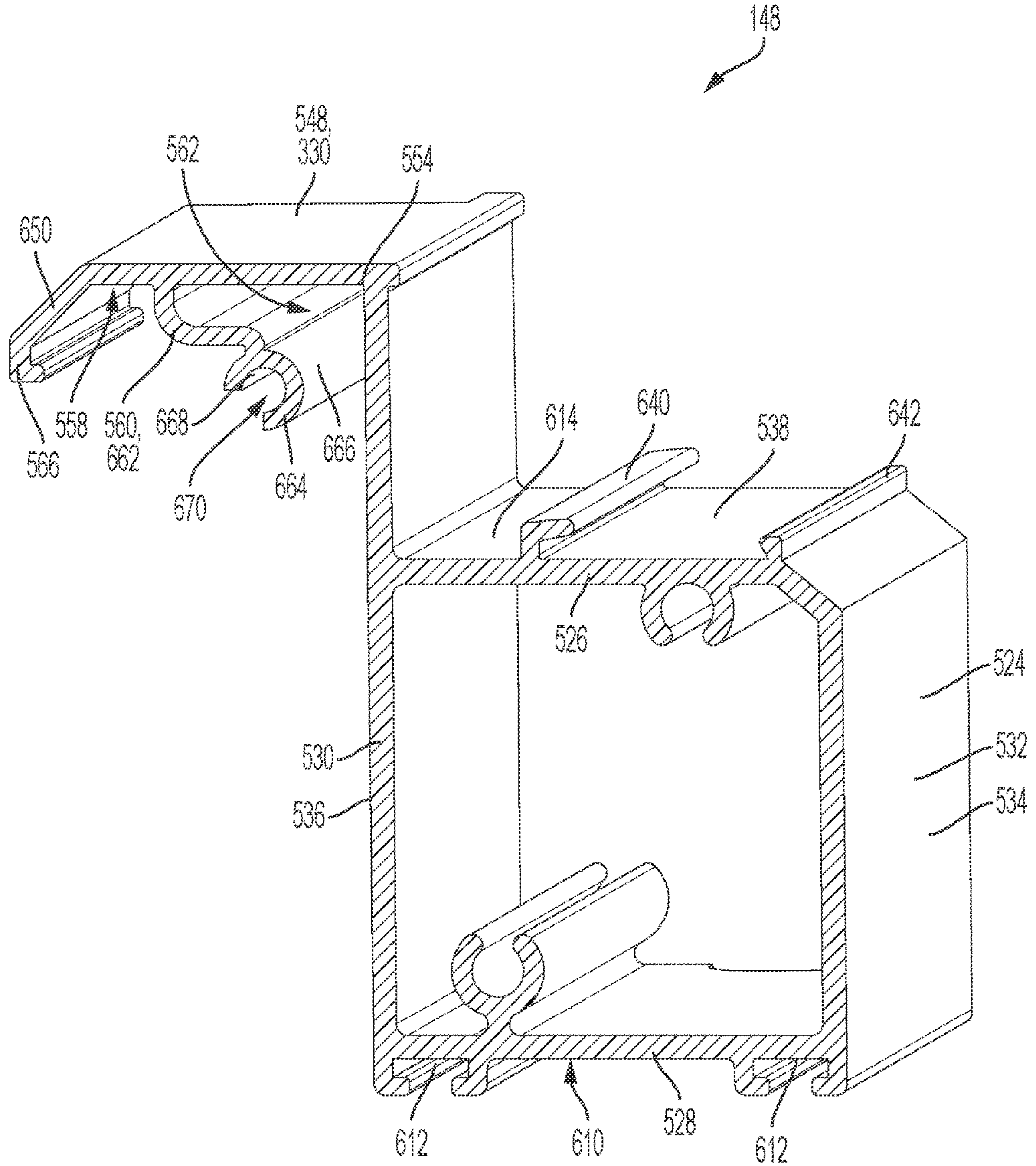
FIG. 6 is a side cross-sectional view of the lower rail of in accordance with an aspect of the present disclosure.

FIG. 6 illustrates the lower rail 148 in accordance with an example aspect of the present disclosure. As shown, the lower rail 148 can comprise the upper rail wall 526, the lower rail wall 528, the front rail wall 530, and the rear rail wall 532, which together can define the hollow, elongated support portion 524. The support portion 524 can define a substantially rectangular cross-section. The front and rear rail walls 530,532 can extend from the lower rail wall 528 to the upper rail wall 526 at opposing front and rear sides 536,534 of the support portion 524, and the front rail wall 530 can extend upward beyond the upper rail wall 526. In some aspects, a lower wall surface 610 of the lower rail wall 528 can define one or more rail sealing slots 612 extending along a length of the support portion 524, each of which can be configured to receive a compressive seal, such as another weather strip, therein. However, in the present aspect, it can be unnecessary to provide such seals within the rail sealing slots 612 because the gap 265 (shown in FIG. 2) defined between the support portion 524 and the sill ledge 228 (shown in FIG. 2) prohibits support portion 524 from engaging the sill ledge 228. As shown, an upper wall surface 614 of the upper rail wall 526 can define the rail notch 538 configured to receive the lower bead 430 (shown in FIG. 4), and the lower bead 430 can be snapped into the rail notch 538 to secure the lower bead 430 to the lower rail 148. In the present aspect, the rail notch 538 can be defined by a hook

640 and an angled backing wall 642 spaced from the hook 640, each extending from the upper wall surface 614. In other aspects, the lower bead 430 can be secured to the lower rail 148 by any other suitable fastener or fastening technique. In other aspects, the lower bead 430 can be monolithically formed with the lower rail 148.

The lower rail 148 can further comprise the hand ledge 330 extending from the front rail wall 530 at the upper rail end 548 of the lower rail 148. The hand ledge 330 can be oriented substantially perpendicular to the front rail wall 530, and the rail corner 554 can be defined at the junction therebetween. In some aspects, the ledge lip 566 may not extend directly from the hand ledge 330. For example, in the present aspect, a gripping ledge 650 can extend generally outward and downward from the hand ledge 330, distal to the upper rail wall 526, and the ledge lip 566 can extend from the gripping ledge 650. The gripping ledge 650 can be manually cupped and gripped by a user to facilitate sliding the lower sash 144 (shown in FIG. 1) relative to the frame 120 (shown in FIG. 1) between the open and closed positions. Additionally, the retaining projection 560 can extend from the lower handle surface 558 of the hand ledge 330. In example aspects, the retaining projection 560 can extend substantially along the length of the hand ledge 330. The retaining projection 560, the hand ledge 330, and the front rail wall 530 can together define the seal retaining channel 562 therebetween generally at the rail corner 554 of the lower rail 148. In the present aspect, the retaining projection 560 can define a projection leg 662 extending from the lower handle surface 558 towards the front rail wall 530. The retaining projection 560 can further define an elongate and substantially arcuate retaining rib 664 extending from the projection leg 662 opposite the hand ledge 330. The retaining rib 664 can be substantially C-shaped in the present aspect. An arcuate outer surface 666 of the retaining rib 664 can be configured to engage a corresponding retaining recess, such as an elongate and substantially arcuate groove 730 (shown in FIG. 7B), formed in the weather strip 152 (shown in FIG. 1) to retain the upper portion 564 (shown in FIG. 5) of the weather strip 152 within the seal retaining channel 562 of the lower rail 148.

The C-shaped retaining rib 664 can further define an arcuate inner surface 668, which can define a rib channel 670, as shown. In some aspects, a window security device can engage the rib channel 670, and can be configured to selectively lock and unlock the lower sash 144 in the closed position. Some aspects of the window security device can be substantially similar to the window security device shown and described in U.S. Publication No. 2019/0211582, filed Jul. 26, 2018, and published on Jul. 11, 2019, which is hereby specifically incorporated by reference herein in its entirety.

Figure 7A:
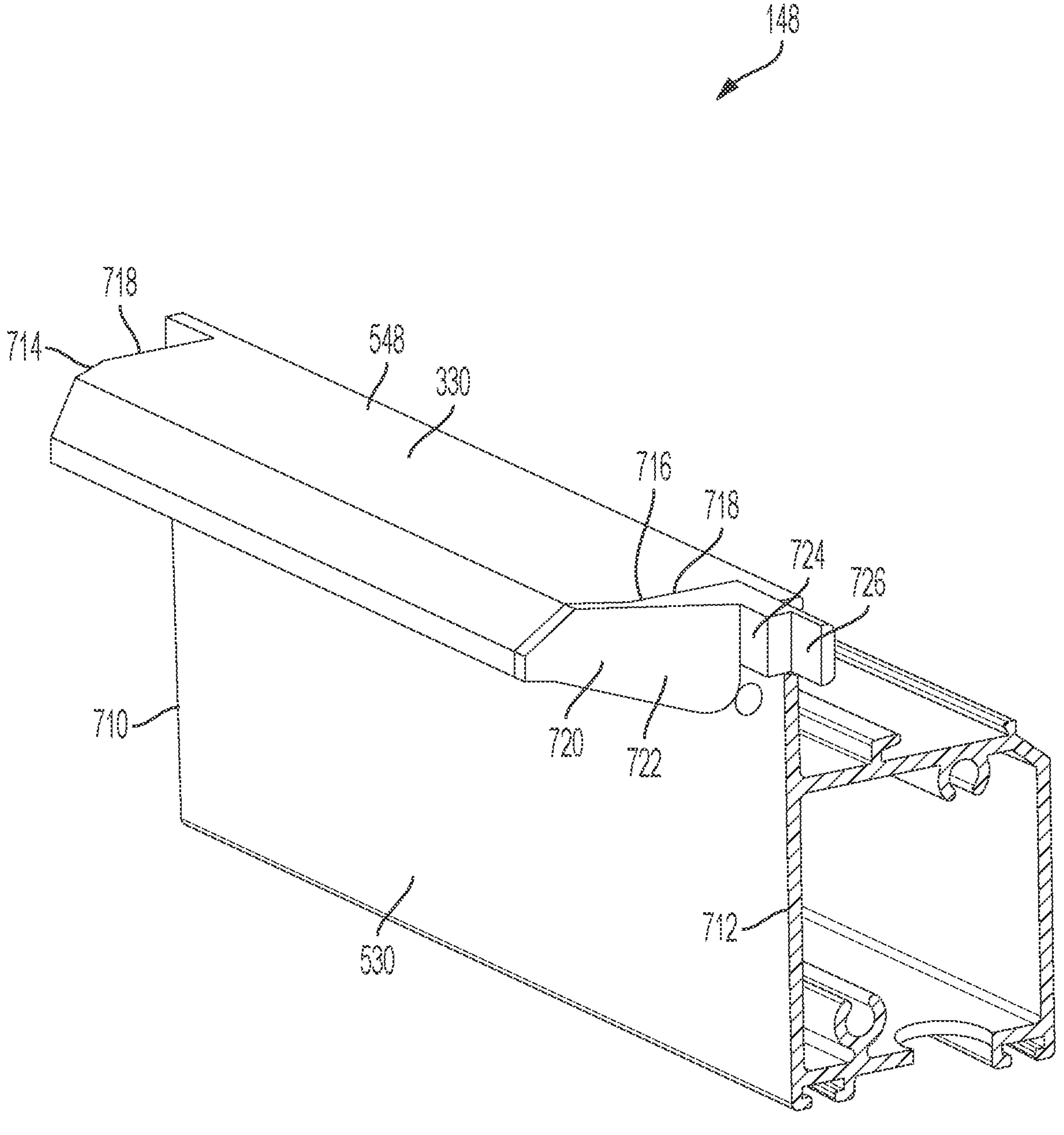
FIG. 7A is a front perspective view of an end of the lower rail of FIG. 6.

FIG. 7A illustrates an end perspective of the lower rail 148 of the lower sash 144 (shown in FIG. 1), according to an example aspect of the present disclosure. As shown, the front rail wall 530 can extend from a left rail side 710 of the lower rail 148 to a right rail side 712 of the lower rail 148. The hand ledge 330 can extend outward from and substantially perpendicular to the front rail wall 530 at the upper rail end 548 of the lower rail 148. In example aspects, the hand ledge 330 can extend largely along a length of the front rail wall 530; however, the hand ledge 330 may not extend fully along the length of the front rail wall 530. For example, as shown, a left ledge side 714 of the hand ledge 330 can stop short of the left rail side 710, and a right ledge side 716 of the hand ledge 330 can stop short of the right rail side 712. Thus, a substantially L-shaped handle notch 718 can be defined between the hand ledge 330 and the front rail wall 530 at each of the left rail side 710 and the right rail side 712. According to example aspects, a rail guide cap 720 can be received within each of the handle notches 718 and can be coupled to the hand ledge 330 at the corresponding left rail side 710 or right rail side 712. In FIG. 7A, only the rail guide cap 720 at the right rail side 712 is illustrated, such that the handle notch 718 formed at the left rail side 710 can be clearly shown.

According to example aspects, each of the rail guide caps 720 can define a cap body 722 received in the corresponding handle notch 718 and abutting the hand ledge 330 at the corresponding left ledge side 714 or right ledge side 716 thereof. The cap body 722 can be configured to cover the retaining projection 560 (shown in FIG. 5) and the upper portion 564 (shown in FIG. 5) of the weather strip 152 (shown in FIG. 1) at the corresponding left ledge side 714 or right ledge side 716. Example aspects of the rail guide cap 720 can further define a jamb block 724 extending outwardly from the cap body 722, away from the left or right ledge side 714,716. The jamb block 724 can be configured to confront the corresponding left or right side jamb 132,134 (shown in FIG. 1) of the frame 120 (shown in FIG. 1). Furthermore, each of rail guide caps 720 can define a guide tab 726 extending from the jamb block 724 towards the corresponding left or right side jamb 132,134. Each of the guide tabs 726 can be configured to engage the jamb channel 510 (shown in FIG. 7B) of the corresponding left side jamb 132 or right side jamb 134 and can slide within the corresponding jamb channel 510 as the lower sash 144 is moved between the open and closed positions. Each of the rail guide caps 720 can further comprise one or more engagement legs 734 (shown in FIG. 7B) extending from the cap body 722, which can engage the hand ledge 330 at the corresponding left or right rail side 710,712 to secure the rail guide cap 720 thereto.

Figure 7B:
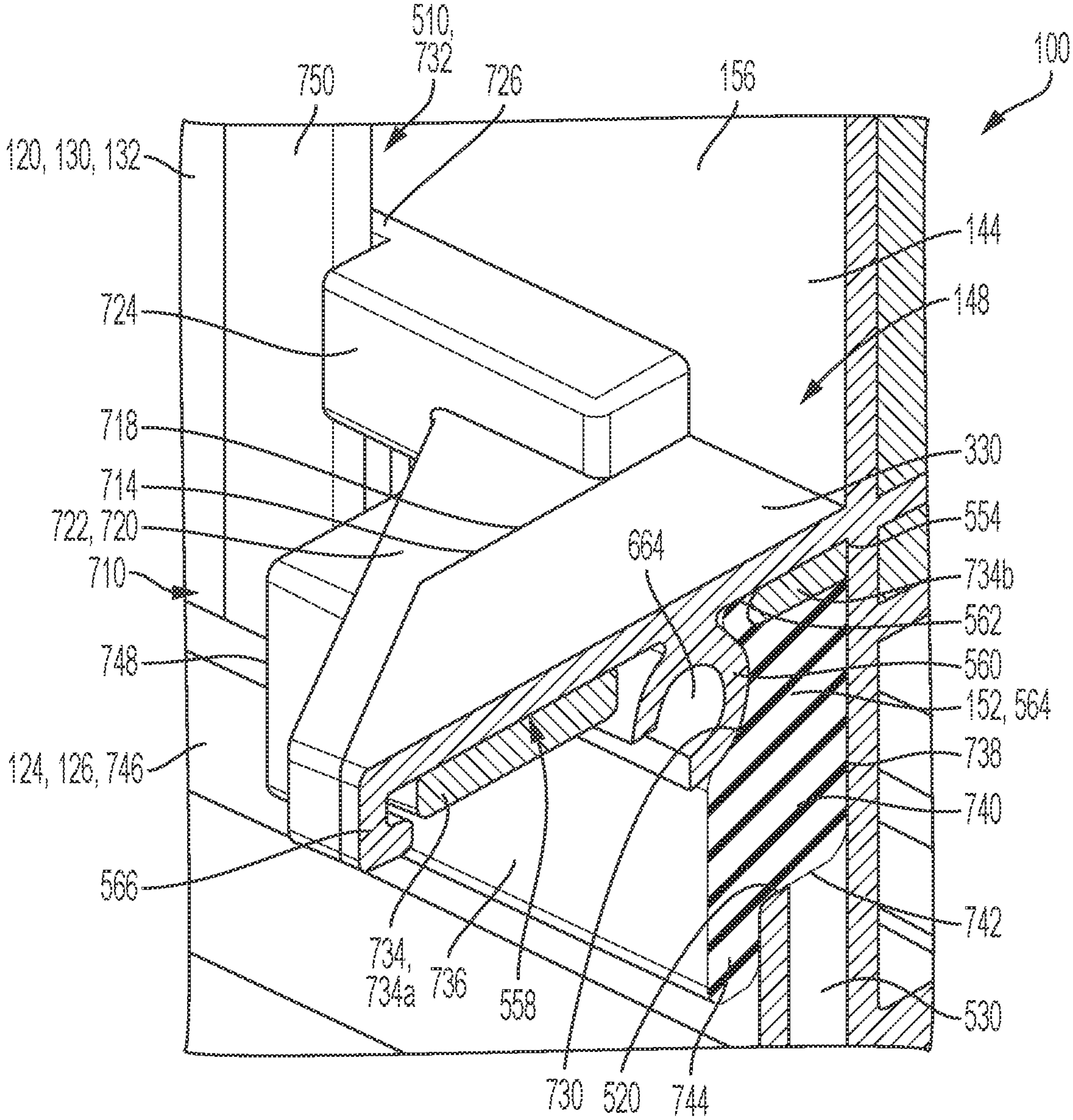
FIG. 7B is a front perspective cross-sectional view of the lower rail of FIG. 3 taken along line 7-7 in FIG. 13.
Figure 13:
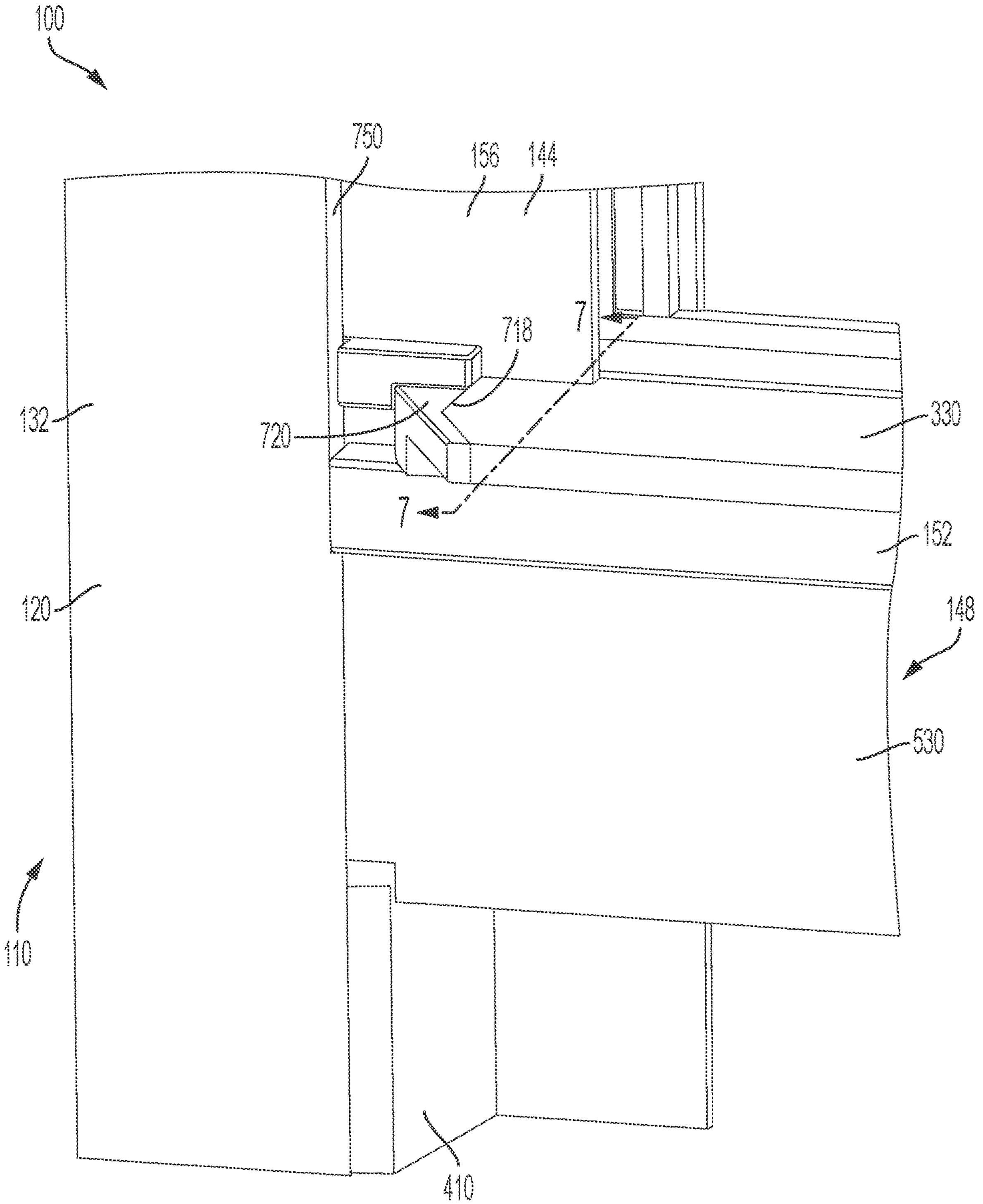
FIG. 13 is a front perspective view of the lower rail of FIG. 3 engaged with the sill of FIG. 3 and the side jamb of FIG. 10.

FIG. 7B illustrates a cross-sectional view of one of the rail guide caps 720 engaged with the lower rail 148 and the corresponding side jamb 130, taken along line 7-7 in FIG. 13. Specifically, the rail guide cap 720 arranged at the left rail side 710 is illustrated. As shown, the cap body 722 of the rail guide cap 720 can abut the hand ledge 330 at the left ledge side 714 thereof. The jamb block 724 of the rail guide cap 720 can extend from the cap body 722 and can confront the left side jamb 132. The jamb block 724 can further confront the left stile 156 of the lower sash 144, and the left stile 156 can slidably engage the jamb channel 510 of the left side jamb 132. Additionally, the guide tab 726 of the rail guide cap 720 can extend from the jamb block 724 and can slidably engage the jamb channel 510 of the left side jamb 132. Specifically, a guide slot 732 can be defined in the jamb channel 510 between the left side jamb 132 and the left stile 156, and the guide tab 726 can engage and slide within the guide slot 732 as the left stile 156 slides vertically upward and downward within the jamb channel 510.

Example aspects of the rail guide caps 720 can further define the pair of engagement legs 734 extending from the cap body 722 and engaging the hand ledge 330 at the left ledge side 714. As shown, an outer engagement leg 734*a* of a pair of the engagement legs 734 can extend from the cap body 722 beneath the hand ledge 330, between the ledge lip 566 and the retaining projection 560. The outer engagement leg 734*a* can confront and abut the lower handle surface 558 of the hand ledge 330. Additionally, an inner engagement leg 734*b* of the pair of engagement legs 734 can extend from the cap body 722 beneath the hand ledge 330 and can engage the seal retaining channel 562 of the hand ledge 330. The inner engagement leg 734*b* can confront and abut the lower handle surface 558 of the hand ledge 330. In example aspects, the inner engagement leg 734*b* can extend adjacent to the front rail wall 530 and can be disposed generally at the rail corner 554 defined between the front rail wall 530 and the hand ledge 330. As shown, the upper portion 564 of the weather strip 152 can be received within the seal retaining channel 562. The retaining rib 664 of the retaining projection 560 can engage the arcuate groove 730 formed in the upper portion 564 of the weather strip 152 to retain the upper portion 564 within the seal retaining channel 562. According to example aspects, the weather strip 152 can deform around the inner engagement leg 734*b* and can press the inner engagement leg 734*b* upward against the lower handle surface 558 of the hand ledge 330, which can secure the rail guide cap 720 to the hand ledge 330.

Example aspects of the weather strip 152 can define a front seal end 736 and rear seal end 738. As shown, the rear seal end 738 can extend along the front rail wall 530. The upper portion 564 of the weather strip 152 can extend laterally from the rear seal end 738 to the arcuate groove 730, and the arcuate groove 730 can extend into the weather strip 152 at the front seal end 736. The weather strip 152 can further define a lower portion 740 extending substantially downward from the upper portion 564 and disposed outside of the seal retaining channel 562. The lower portion 740 of the weather strip 152 can define a substantially horizontal bottom shoulder 742 extending from the rear seal end 738 towards the front seal end 736. The bottom shoulder 742 can be disposed distal to the upper portion 564 and can be configured to engage the sill flange 126 at the upper sill end 520 of the sill 124, as shown, to aid in preventing air and water from passing across the window frame assembly 100 between the lower rail 148 and the sill 124. The lower portion 740 can further define an overhang portion 744 extending substantially downward from the bottom shoulder 742 at the front seal end 736 of the weather strip 152. The overhang portion 744 of the weather strip 152 can overhang and extend substantially downward along a front sill surface 746 of the sill flange 126.

In example aspects, the weather strip 152 can extend fully along the length of the lower rail 148 from the left rail side 710 to the right rail side 712 (shown in FIG. 7A), and may extend beyond the left and right rail sides 710,712. In some aspects, a left seal side 748 of the weather strip 152 can confront an inner edge 750 the left side jamb 132 of the frame 120 and a right seal side 848 (shown in FIG. 8) of the weather strip 152 can confront the inner edge 750 the right side jamb 134 (shown in FIG. 1) of the frame 120. Moreover, in some aspects, including the present aspect, the left and right seal sides 748,848 of the weather strip 152 can engage and seal with the inner edges 750 of the corresponding left and right side jambs 132,134 to seal the weather strip 152 with the side jambs 130. Specifically, in the present aspect, the lower portion 740 of the weather strip 152 can engage and seal with the left and right side jambs 132,134. The seals created between the weather strip 152 and the side jambs 130 can aid in preventing and air and water from passing across the window frame assembly 100 between the lower rail 148 and the side jambs 130 at the left and right rail sides 710,712 of the lower rail 148.

Figure 8:
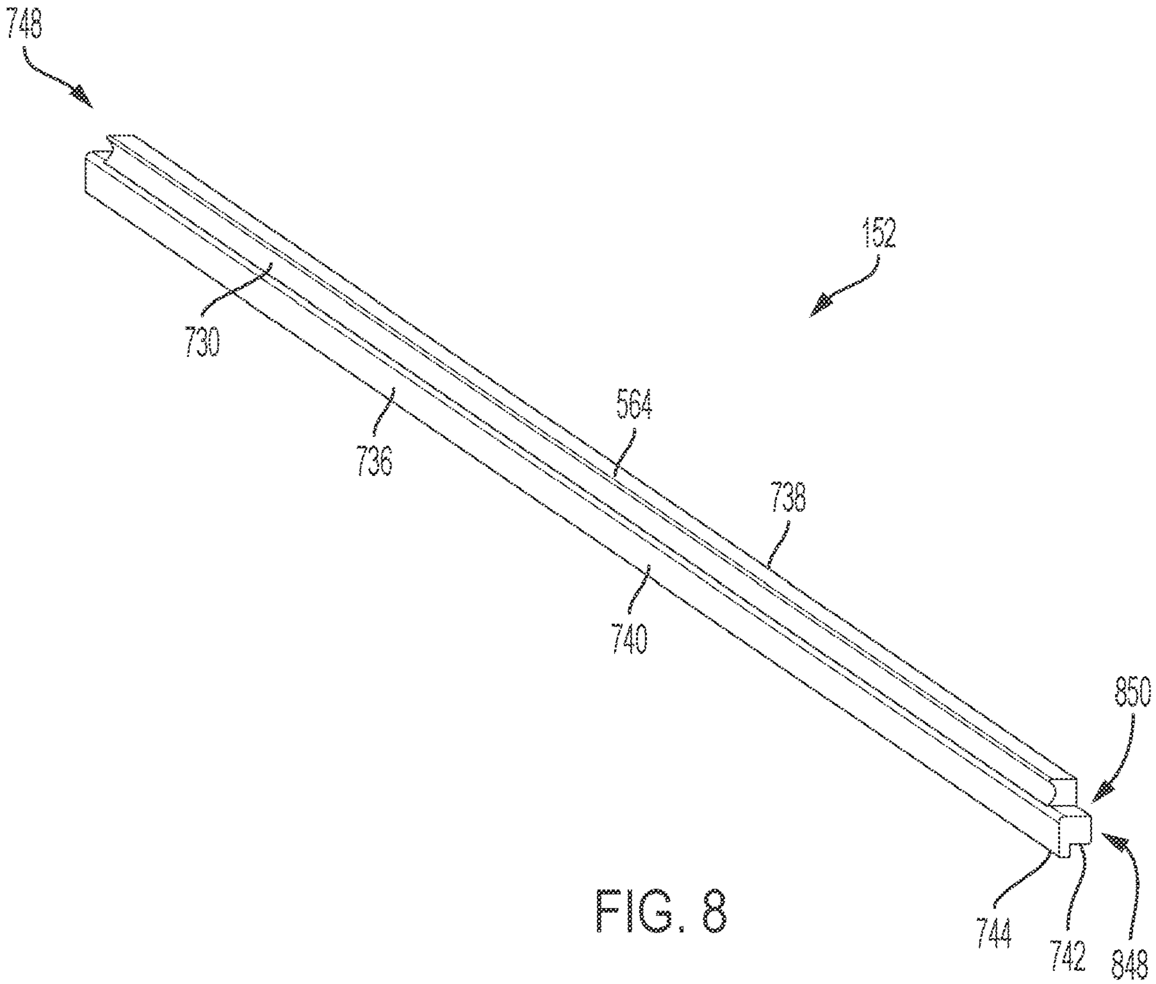
FIG. 8 is a perspective view of a seal of the window frame assembly of FIG. 1.
Figure 9:
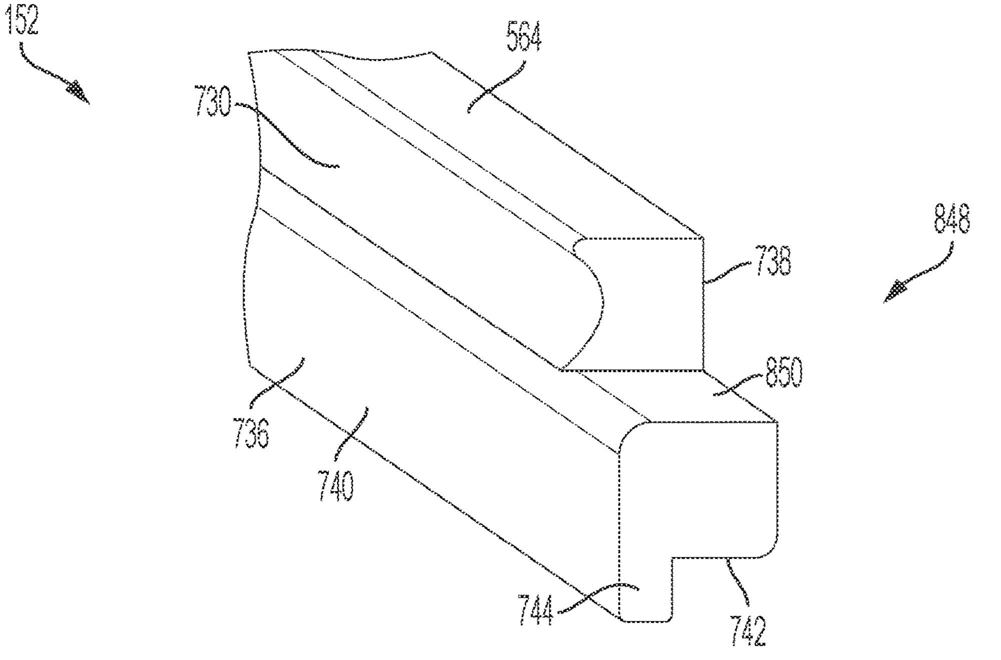
FIG. 9 is a detail perspective view of an end of the seal of FIG. 8.

FIGS. 8 and 9 illustrate a perspective view and a detail perspective view, respectively, of the weather strip 152 in accordance with example aspects of the invention. The weather strip 152 can define the front seal end 736, the rear seal end 738, the left seal side 748, and the right seal side 848. The weather strip 152 can further define the upper portion 564 and the lower portion 740. As shown, the arcuate groove 730 can extend into the upper portion 564 at the front seal end 736. The lower portion 740 can define the substantially horizontal bottom shoulder 742 distal to the upper portion 564 and can further define the overhang portion 744 extending substantially downward from the bottom shoulder 742 at the front seal end 736. According to example aspects, the lower portion 740 of the weather strip 152 can extend from the left seal side 748 to the right seal side 848 and can define a length of weather strip 152. However, the upper portion 564 may not extend fully along the length of the weather strip 152, but rather can stop short of the left seal side 748 and the right seal side 848. Thus, a seal side notch 850 can be defined between the upper portion 564 and the lower portion 740 at each of the left seal side 748 and the right seal side 848. According to example aspects, when the lower rail 148 (shown in FIG. 1) is assembled, each of the seal side notches 850 can overlap with a corresponding one of the handle notches 718 (shown in FIG. 7A), and the cap body 722 (shown in FIG. 7A) of a corresponding one of the rail guide caps 720 (shown in FIG. 7A) can be received within the corresponding handle notch 718 and the overlapping seal side notch 850.

FIG. 10 illustrates the sealing block 410 positioned within the jamb channel 510 of the left side jamb 132. Another one of the sealing blocks 410 can be positioned within the jamb channel 510 of the right side jamb 134 (shown in FIG. 1). Also illustrated is the left stile 156 of the lower sash 144 engaged with the jamb channel 510 of the left side jamb 132. The right stile 158 (shown in FIG. 1) of the lower sash 144 can similarly be engaged with the jamb channel 510 of the right side jamb 134. Specifically, each of the left and right stiles 156,158 can comprise a slide rail 1014 slidably positioned within the jamb channel 510. Both the lower rail 148 (shown in FIG. 1) and the sill 124 (shown in FIG. 1) are removed in the present view for better visibility of the sealing block 410 and the left stile 156. As shown, a first pair of the stile fasteners 1010 (e.g., the screws 1012) can extend through the left stile 156. As described above, each of the stile fasteners 1010 can engage a corresponding one of the arcuate rail fastener ribs 544 (shown in FIG. 5) of the lower rail 148 to couple the lower rail 148 to the left stile 156. A second pair of the stile fasteners 1010 can extend through the right stile 158, and each of the second pair of stile fasteners 1010 can also engage a corresponding one of the arcuate rail fastener ribs 544 to couple the lower rail 148 to the right stile 158.

Example aspects of the sealing blocks 410 can be formed by injection molding. In some aspects, the sealing blocks 410 can comprise a plastic material, such as nylon or polypropylene. In other aspects, the sealing blocks 410 can comprise any other suitable material and can be formed by any other suitable manufacturing process. As shown, the sealing block 410 can be positioned within the jamb channel 510 at a bottom end 1016 of the left side jamb 132. The sealing block 410 can define a top block surface 1018 and a bottom block surface 1020. According to example aspects, the bottom block surface 1020 can be configured to rest on the upper ledge surface 428 (shown in FIG. 4) of the sill ledge 228 (shown in FIG. 2). In the present aspect, the bottom block surface 1020 can be sloped to match the downward slope of the sill ledge 228. The top block surface 1018 can face upward towards the left stile 156 within the jamb channel 510. In some aspects, one of the sealing gaskets 1630 (shown in FIG. 16) can be positioned on the top block surface 1018 within a gasket space 1030 defined between the sealing block 410 and the left stile 156. The sealing gasket 1630 is removed from the present view for visibility of the top block surface 1018, but is shown and described with respect to FIGS. 16 and 17. According to example aspects, the sealing gasket 1630 can be formed from a compressive material, such as neoprene, polyethylene, or a similar compressive and/or foam material in example aspects. In other aspects, the sealing gasket 1630 can comprise any other suitable material known in the art. According to example aspects, when the lower sash 144 is in the closed position, the slide rail 1014 of each of the left and right stiles 156,158 can bear down on and seal with the sealing gasket 1630 atop the corresponding sealing block 410 to prevent the passage of air and water therebetween at the corresponding left and right bottom corners 110,112 (right bottom corner 112 shown in FIG. 1) of the window frame assembly 100 (shown in FIG. 1).

Figure 11:
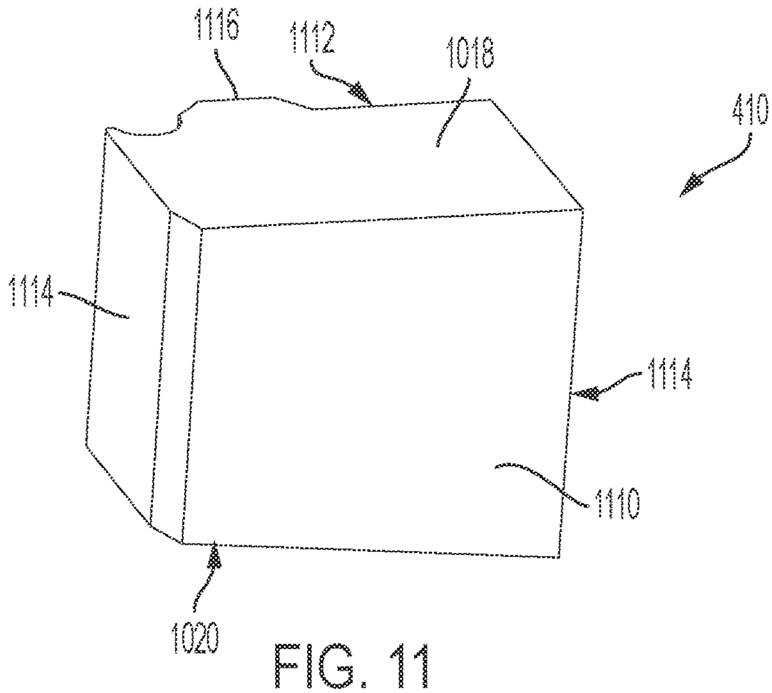
FIG. 11 is a perspective view of the sealing block of FIG. 10.

FIG. 11 illustrates one of the sealing blocks 410 in accordance with an example aspect of the present disclosure. As shown, the sealing block 410 can define the top block surface 1018 and the bottom block surface 1020 opposite the top block surface 1018. The bottom block surface 1020 can be sloped as described above. The sealing block 410 can further define an inward block surface 1110, an outward block surface 1112 opposite the inward block surface 1110, and opposing side block surfaces 1114. In some aspects, the sealing block 410 can be shaped to substantially conform to the shape of the jamb channel 510 (shown in FIG. 12). For example, in the present aspects, the sealing block 410 can define a block ridge 1116 extending substantially vertically along the outward block surface 1112. The block ridge 1116 can engage a corresponding jamb groove 1210 (shown in FIG. 12) formed in the corresponding side jamb 130. Example aspects of the sealing block 410 can be injection molded as described above, and can comprise a plastic material in some aspects. In other aspects, the sealing block 410 can comprise any other suitable material and/or can be formed by any other suitable manufacturing process. In some aspects, the sealing block 410 can further be precision machined, so that the sealing block 410 can precisely match the contour of the sill ledge 228 (shown in FIG. 12) and the corresponding side jamb 130 (shown in FIG. 12).

Figure 12:
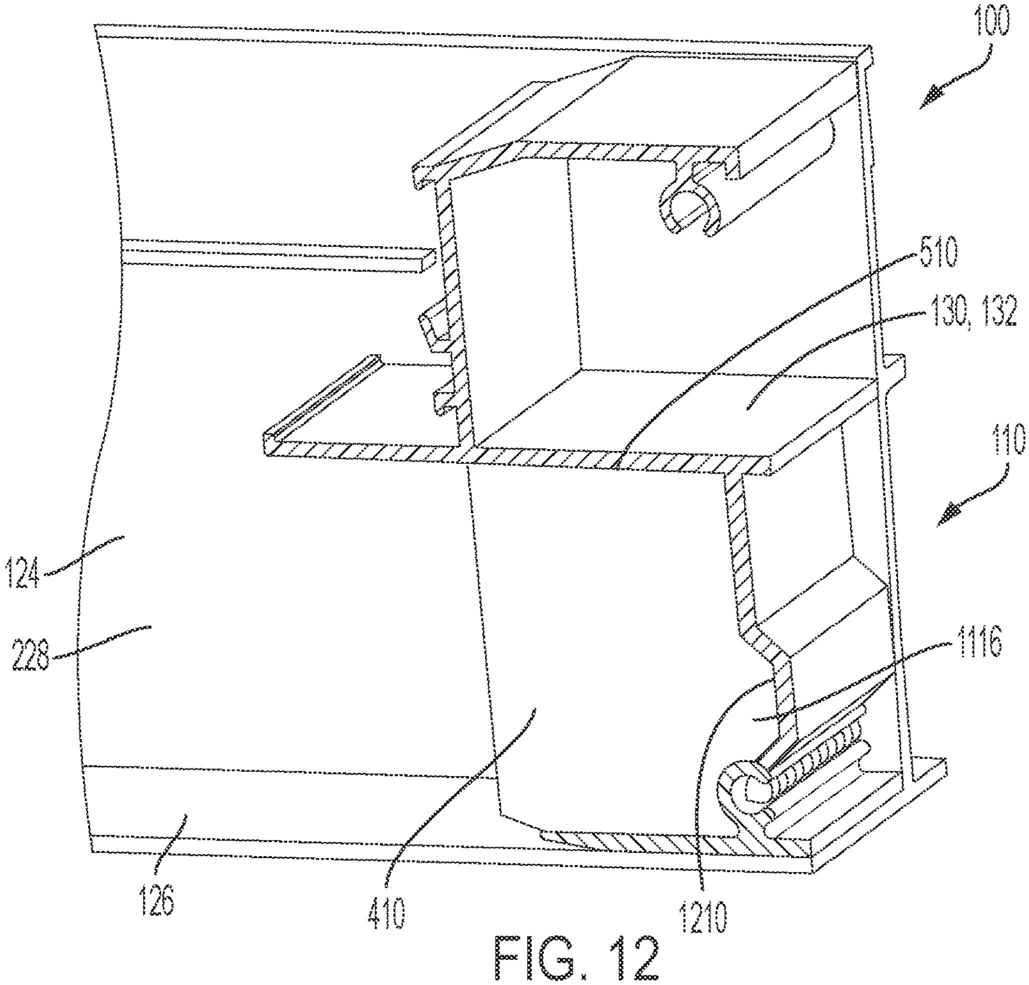
FIG. 12 is a top perspective cross-sectional view of the side jamb taken along line 12-12 in FIG. 10.

FIG. 12 illustrates a cross-sectional view of the sealing block 410 engaged with the corresponding side jamb 130. As described above, in example aspects, the sealing block 410 can be precision machined to precisely match the contour of the side jamb 130 and the sill ledge 228, thus preventing water infiltration into the side jambs 130 at the corresponding left and right bottom corners 110,112 (right bottom corner 112 shown in FIG. 1) of the window frame assembly 100.

Figure 14:
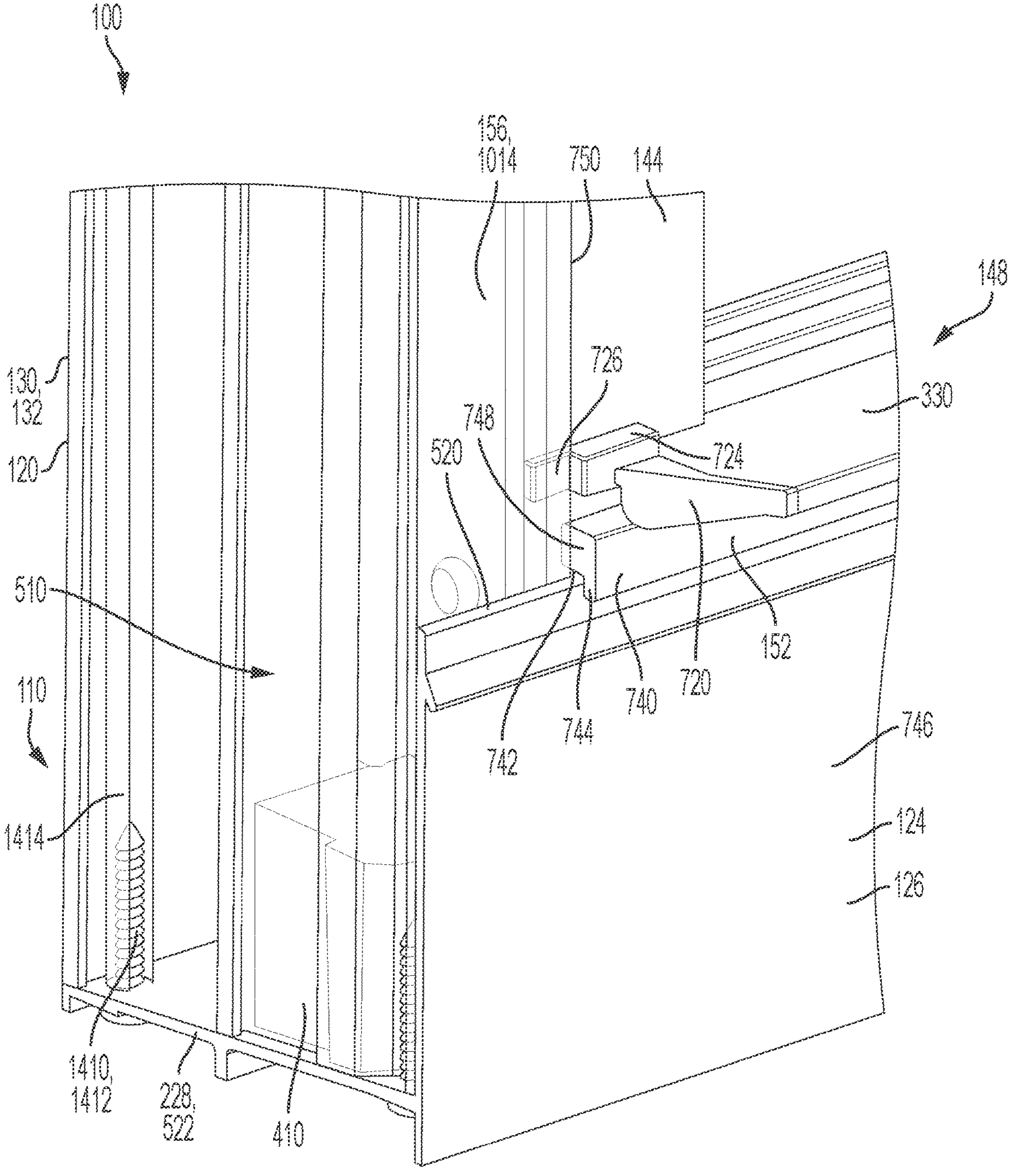
FIG. 14 is another front perspective view of the lower rail of FIG. 3 engaged with the sill of FIG. 3 the side jamb of FIG. 10, wherein the side jamb is illustrated as transparent.

FIGS. 13 and 14 illustrate detail front perspective views of the lower sash 144 engaged with the frame 120. In FIG. 13, the sill 124 (shown in FIG. 1) is removed for visibility of the sealing block 410. In FIG. 14, the left side jamb 132 is illustrated as transparent for visibility therethrough. Specifically, FIGS. 13 and 14 illustrate the left bottom corner 110 of the window frame assembly 100, which can be substantially the same as the right bottom corner 112 (shown in FIG. 1) thereof. Referring to FIG. 13, as shown, the lower sash 144 can comprise the lower rail 148 and the left stile 156, and the frame 120 can comprise the left side jamb 132. The lower sash 144 can further comprise the upper rail 146 (shown in FIG. 1) and the right stile 158 (shown in FIG. 1). The lower rail 148 can comprise the front rail wall 530 and the hand ledge 330 extending therefrom. The weather strip 152 can be coupled to the hand ledge 330 at the rail corner 554 (shown in FIG. 5) formed between the front rail wall 530 and the hand ledge 330. In some aspects, the weather strip 152 can engage and seal with the inner edge 750 of the left side jamb 132, as shown. The lower rail 148 can further comprise the rail guide cap 720 received in the corresponding handle notch 718 of the lower rail 148. The guide tab 726 (shown in FIG. 7A) of the rail guide cap 720 and the left stile 156 of the lower sash 144 can slidably engage the jamb channel 510 (shown in FIG. 5) of the left side jamb 132 and can be configured to slide vertically upwards and downwards therein. Additionally, the sealing block 410 can be disposed within the jamb channel 510 of the left side jamb 132 at the left bottom corner 110 of the window frame assembly 100. In the closed position of the lower sash 144, the left stile 156 can be compressed against the sealing gasket 1630 (shown in FIG. 16) positioned atop the sealing block 410 to create a seal therebetween. Rainwater washing into the left bottom corner 110 of the window frame assembly 100 can be prohibited from leaking between the left side jamb 132 and the lower sash 144, and similarly, rainwater washing into the right bottom corner 112 of the window frame assembly 100 can be prohibited from leaking between the right side jamb 134 and the lower sash 144. Thus, water infiltration can be prevented at each of the left and right bottom corners 110,112 of the window frame assembly 100.

Referring now to FIG. 14, the frame 120 can comprise the sill 124 and the left side jamb 132, as shown. The frame 120 can also comprise the head 122 (shown in FIG. 1) and the right side jamb 134 (shown in FIG. 1). The sill 124 can comprise the substantially vertical sill flange 126 and the substantially horizontal sill ledge 228. The sill ledge 228 can be defined at the lower sill end 522, and the sill flange 126 can extend upward from the sill ledge 228 to the upper sill end 520. In some aspects, as shown, the sill ledge 228 can slope slightly downward relative to the horizontal, away from the sill flange 126, which can facilitate the flow of water off of the sill ledge 228 and out of the gap 265 (shown in FIG. 15). The left side jamb 132 is illustrated as transparent, such that the sealing block 410 disposed within the jamb channel 510 (seen through the transparent left side jamb 132) is visible. The slide rail 1014 of the left stile 156 and the guide tab 726 of the corresponding rail guide cap 720 are also visible extending into the jamb channel 510. In example aspects, the sill 124 can be coupled to each of the side jambs 130. For example, as shown in the present view, the sill ledge 228 can be coupled to the left side jamb 132 by one or more frame fasteners 1410. The sill ledge 228 can further be coupled to the right side jamb 134 by one or more frame fasteners 1410. In the present aspect, each of the frame fasteners 1410 can extend through the sill ledge 228 and can engage an arcuate jamb fastener rib 1414 of the corresponding left or right side jamb 132,134. The arcuate jamb fastener ribs 1414 of the side jambs 130 can be substantially the same as or similar to the arcuate rail fastener ribs 544 (shown in FIG. 5) of the lower rail 148. The frame fasteners 1410 can be screws 1412, as shown. In other aspects, the sill 124 can be secured to the side jambs 130 by any other suitable fastener, such as bolts, or any other suitable fastening technique, such as welding, gluing, or the like.

As described in detail above, the weather strip 152 can be coupled to the hand ledge 330 of the lower rail 148. In the closed position of the lower sash 144, the weather strip 152 can engage and seal with the sill flange 126 at the upper sill end 520 along a length of the sill 124 between the left and right side jambs 132,134. Specifically, as shown, the bottom shoulder 742 of the weather strip 152 can abut the sill flange 126 at the upper sill end 520, and the overhang portion 744 of the weather strip 152 can wrap over the upper sill end 520 and can extend substantially downward along the front sill surface 746 of the sill flange 126. Furthermore, the left and right seal sides 748,848 (right seal side 848 shown in FIG. 8) of the weather strip 152 can engage and seal with the inner edges 750 of the left and right side jambs 132,134, respectively. Specifically, the lower portion 740 of the weather strip 152 can engage the inner edges 750 of the side jambs 130. Thus, water infiltration can be prevented by the weather strip 152 along the full length of the sill 124 between the left and right side jambs 132,134.

Figure 15:
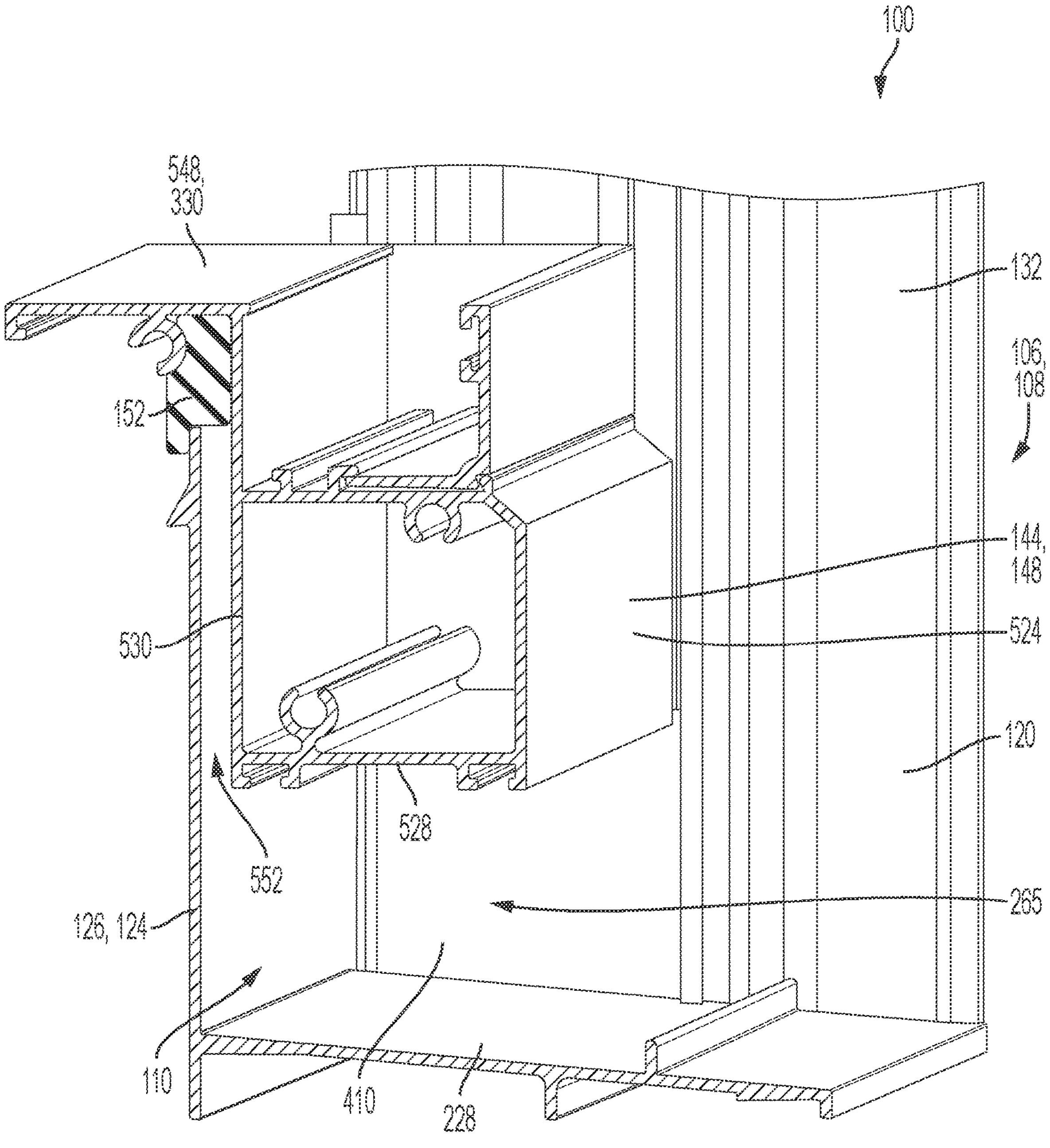
FIG. 15 is a rear perspective cross-sectional view of the lower rail and the sash of FIG. 3 taken along line 5-5 in FIG. 4.

FIG. 15 illustrates a cross-sectional rear perspective view of the lower sash 144 engaged with the frame 120. As shown, the sill 124 of the frame 120 comprises the sill ledge 228 and the sill flange 126. The lower rail 148 of the lower sash 144 can comprise the support portion 524. The front rail wall 530 can extend upward beyond the support portion 524 to the upper rail end 548 of the lower rail 148. The hand ledge 330 can extend from the front rail wall 530 at the upper rail end 548. The gap 265 can be defined between the sill ledge 228 and the lower rail wall 528 of the lower rail 148, and the flow channel 552 can be defined between the sill flange 126 and the front rail wall 530. The gap 265 can be formed at the rear side 106 of the window frame assembly 100 (i.e., the outdoors-facing side 108), and thus, rainwater can flow into the gap 265 and the flow channel 552. However, the height of the gap 265 can reduce the rainwater retention between the sill ledge 228 and the lower sash 144 and can allow for improved drainage of the rainwater out of the flow channel 552 and the gap 265, which can be particularly beneficial in heavy rains and hurricanes. Additionally, the weather strip 152 and the sealing blocks 410/sealing gaskets 1630 (shown in FIG. 16) can seal the lower sash 144 with the frame 120 along the length of the sill 124 between the left and right side jambs 132,134 (right side jamb 134 shown in FIG. 1) and at the left and right bottom corners 110,112 (right bottom corner 112 shown in FIG. 1) of the window frame assembly 100 to prevent water infiltration therethrough.

Figure 16:
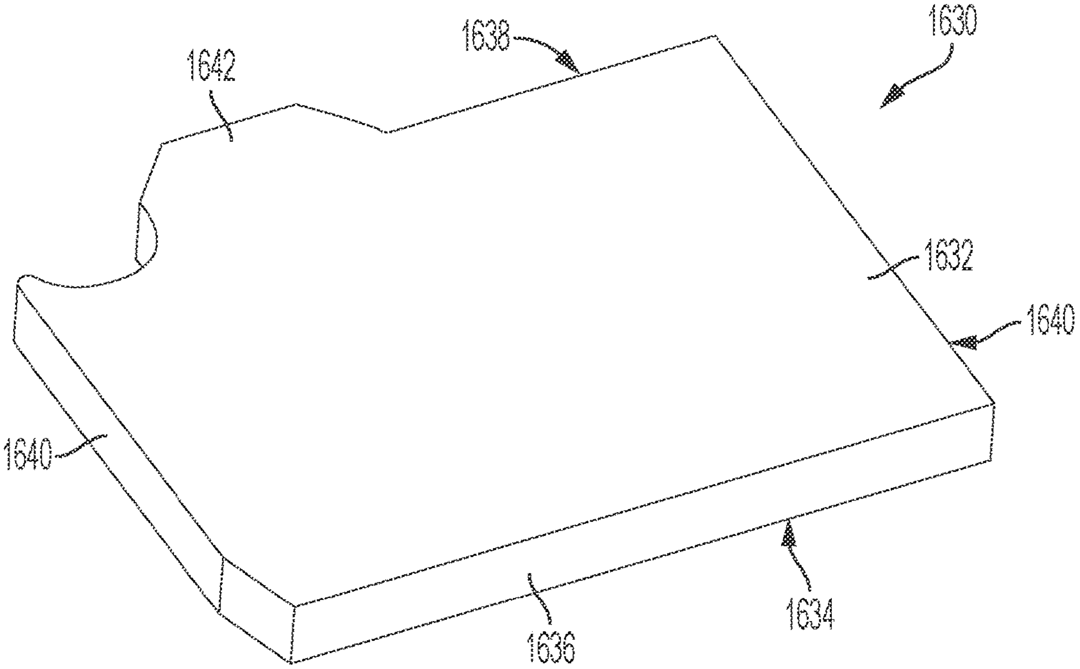
FIG. 16 is a top perspective view of a sealing gasket of the window frame assembly of FIG. 1.

FIG. 16 illustrates one of the sealing gaskets 1630 in accordance with an example aspect of the present disclosure. Each of the sealing gaskets 1630 can comprise a compressive material, such as neoprene, polyethylene, or a similar compressive and/or foam material in example aspects. In other aspects, the sealing gasket 1630 can comprise any other suitable material known in the art. In the present aspect, each of the sealing gaskets 1630 can be similar in size and shape to the sealing blocks 410 (shown in FIG. 17). However, a height of the sealing gaskets 1630 can be less than a height of the sealing blocks 410, and in some aspects, the sealing gaskets 1630 can be substantially flat, as shown. In a particular example aspect, the height of each of the sealing gaskets 1630 can be between about 1/16" and 1/2". In a particular example aspect, the height of each sealing gasket 1630 can be about 1/8". In other aspects, the sealing gaskets can define a height greater than 1/2" or less than 1/16".

Figure 17:
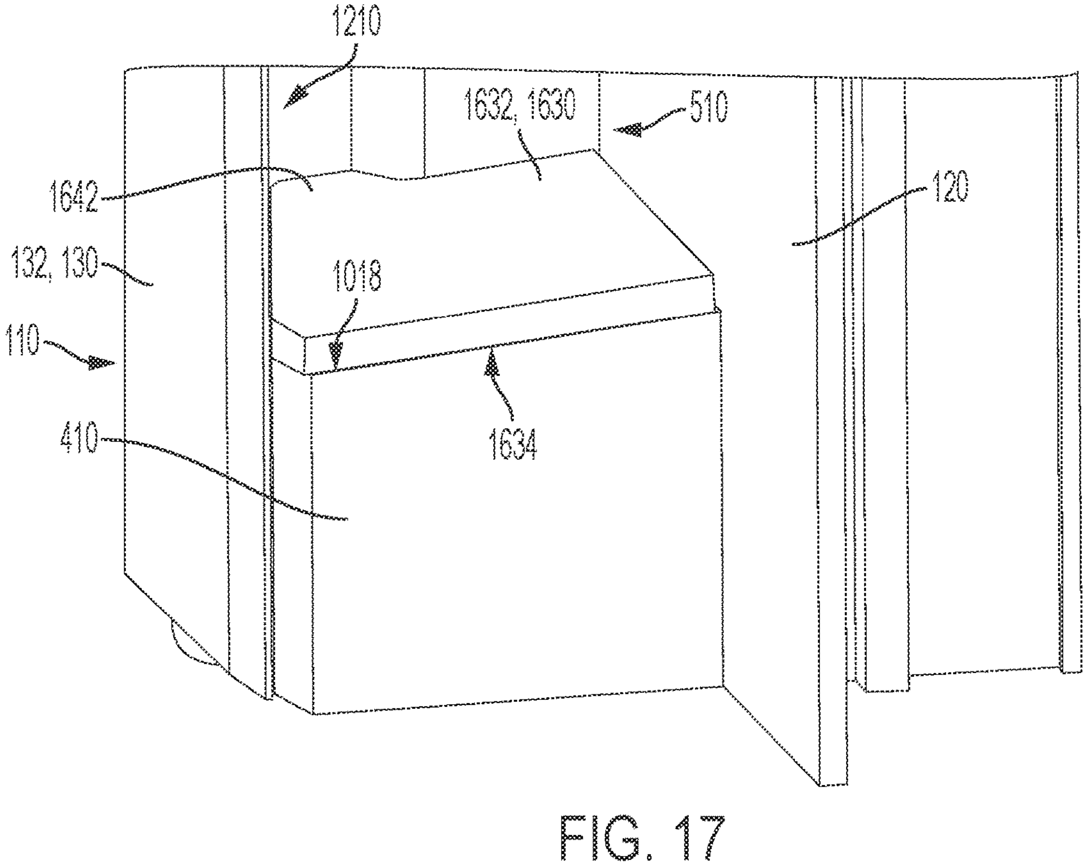
FIG. 17 is a perspective view of the sealing gasket of FIG. 16 assembled with the side jamb of the window frame assembly of FIG. 1.

Each sealing gasket 1630 can define a top gasket surface 1632 and a bottom gasket surface 1634 opposite the top gasket surface 1632. The bottom gasket surface 1634 can confront the top block surface 1018 (shown in FIG. 17) of the corresponding sealing block 410 when the sealing gasket 1630 is mounted thereon, as shown in FIG. 17. The sealing gasket 1630 can further define an inward gasket surface 1636, an outward gasket surface 1638 opposite the inward gasket surface 1636, and opposing side gasket surfaces 1640. Like the sealing block 410, in some aspects, the sealing gasket 1630 can be shaped to substantially conform to the shape of the jamb channel 510 (shown in FIG. 17). For example, in the present aspects, the sealing gasket 1630 can define a gasket ridge 1642 extending substantially along the height of the outward gasket surface 1638. The gasket ridge 1642 can engage the corresponding jamb groove 1210 (shown in FIG. 17) formed in the corresponding side jamb 130 (shown in FIG. 17).

FIG. 17 illustrates one of the sealing gaskets 1630 assembled with the corresponding sealing block 410 and the corresponding side jamb 130 of the frame 120. Specifically, the left side jamb 132 is illustrated in the present view. As shown, the sealing gasket 1630 can be disposed within the jamb channel 510 of the left side jamb 132 and can be positioned on top of the corresponding sealing block 410. The bottom gasket surface 1634 of the sealing gasket 1630 can confront the top block surface 1018 of the sealing block 410. In example aspects, the sealing gasket 1630 can be sized to cover the entire top block surface 1018 of the sealing block 410. In some aspects, the bottom gasket surface 1634 can comprise an adhesive that can adhere the sealing gasket 1630 to the top block surface 1018. Furthermore, the gasket ridge 1642 can engage the corresponding jamb groove 1210 of the side jamb 130, as shown. According to example aspects, when the lower sash 144 (shown in FIG. 1) is in the closed position, the slide rail 1014 (shown in FIG. 10) of each of the left and right stiles 156,158 (shown in FIG. 1) can bear down on and seal with top gasket surface 1632 of the sealing gasket 1630 positioned atop the corresponding sealing block 410 to prevent the passage of air and water therebetween at the corresponding left and right bottom corners 110,112 (right bottom corner 112 shown in FIG. 1) of the window frame assembly 100 (shown in FIG. 1).

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A lift rail and sill assembly for a window frame assembly comprising:

a lift rail defining a lower rail end and an upper rail end, the lift rail further defining a seal retaining channel, the lift rail movable between an open position and a closed position;

a seal received in the seal retaining channel of the lift rail; and a sill defining a lower sill end and an upper sill end, the sill comprising a sill ledge arranged at the lower sill end and a sill flange extending from the sill ledge to the upper sill end;

wherein a gap is defined between the sill ledge and the lower rail end of the lift rail in the closed position to allow fluid to flow between the sill ledge and the lower rail end, and wherein the seal engages the sill flange in the closed position.

2. The lift rail and sill assembly of claim 1, wherein the lift rail comprises a front rail wall, and wherein a flow channel is defined between the front rail wall and the sill flange, the flow channel in fluid communication with the gap, the seal sealing the flow channel at the upper sill end.

3. The lift rail and sill assembly of claim 2, wherein the lift rail further comprises a lower rail wall arranged at the lower rail end, the front rail wall extending from the lower rail wall to the upper rail end, the gap defined between the lower rail wall and the sill ledge.

4. The lift rail and sill assembly of claim 3, wherein the lower rail wall and the front rail wall at least partially define a support portion, the support portion configured to support a window pane thereon and at least partially defining a pane channel configured to receive a lower end of the window pane therein.

5. The lift rail and sill assembly of claim 2, wherein the lift rail further comprises a hand ledge extending from the front rail wall at the upper rail end, wherein the seal retaining channel is defined at a rail corner between the hand ledge and the front rail wall, and wherein the seal defines an upper portion received in the seal retaining channel and a lower portion, the lower portion defining a bottom shoulder engaging the sill flange at the upper sill end in the closed position.

6. The lift rail and sill assembly of claim 5, wherein a retaining projection extends from the hand ledge, the retaining projection engaging a retaining recess of the seal to retain the seal within the seal retaining channel.

7. The lift rail and sill assembly of claim 6, wherein the retaining projection defines an elongate, arcuate retaining rib and the retaining recess defines an elongate, arcuate retaining groove.

8. The lift rail and sill assembly of claim 5, wherein the seal further defines an overhang portion extending substantially downward from the bottom shoulder at a front seal end of the seal, the overhang portion extending along a front sill surface of the sill flange.

9. The lift rail and sill assembly of claim 1, wherein the lift rail defines a front side and a rear side, the front side adjacent to the sill flange and the rear side distal to the sill flange, and wherein the gap is substantially unobstructed from the rear side of the lift rail to the sill flange.

10. A window frame assembly comprising:

a frame comprising a left side jamb, a right side jamb, and a sill, the sill comprising a sill ledge and a sill flange extending upward from the sill ledge;

a sash comprising a left stile, a right stile, and a lift rail, the left stile slidably engaged with the left side jamb, the right stile slidably engaged with the right side jamb, the sash movable between an open position and a closed position relative to the frame, the lift rail defining a seal retaining channel and a lower rail end; and a seal received in the seal retaining channel and engaging the sill flange in the closed position;

wherein a gap is defined between the sill ledge and the lift rail in the closed position to allow fluid to flow between the sill ledge and the lower rail end.

11. The window frame assembly of claim 10, wherein:

the frame defines a front side and a rear side;

the sill flange is disposed proximate to the front side of the frame; and the gap is substantially unobstructed from the rear side of the frame to the sill flange.

12. The window frame assembly of claim 10, wherein:

the window frame assembly defines a left bottom corner and a right bottom corner;

each of the left side jamb and the right side jamb defines a jamb channel;

a sealing block is positioned within each of the jamb channels at each of the left bottom corner and the right bottom corner.

13. The window frame assembly of claim 12, wherein:

a sealing gasket is positioned atop each of the sealing blocks; and each of the left stile and the right stile engages a corresponding one of the sealing gaskets in the closed position.

14. The lift rail and sill assembly of claim 10, wherein the lift rail comprises a front rail wall, and wherein a flow channel is defined between the front rail wall and the sill flange, the flow channel in fluid communication with the gap, the seal sealing the flow channel at an upper sill end of the sill.

15. The lift rail and sill assembly of claim 14, wherein the lift rail further comprises a lower rail wall arranged at the lower rail end, the gap defined between the lower rail wall and the sill ledge, and wherein the lower rail wall and the front rail wall at least partially define a support portion, the support portion configured to support a window pane thereon.

16. The lift rail and sill assembly of claim 14, wherein the seal defines an upper portion received in the seal retaining channel and a lower portion, the lower portion defining a bottom shoulder engaging the sill flange at the upper sill end in the closed position.

17. The lift rail and sill assembly of claim 16, wherein:

the lift rail further comprises a hand ledge extending from the front rail wall at an upper rail end of the lift rail;

the seal retaining channel is defined at a rail corner between the hand ledge and the front rail wall;

a retaining recess is defined in the upper portion of the seal; and a retaining projection extends from the hand ledge and engages the retaining recess to retain the seal within the seal retaining channel.

18. A window frame assembly comprising:

a frame comprising a left side jamb, a right side jamb, and a sill comprising a sill ledge and a sill flange extending upward from the sill ledge, each of the left side jamb and the right side jamb defining a jamb channel;

a sash comprising a left stile, a right stile, and a lift rail extending between the left stile and the right stile and defining a seal retaining channel, the left stile slidably engaged with the left side jamb, the right stile slidably engaged with the right side jamb, the sash movable between an open position and a closed position relative to the frame;

a seal received in the seal retaining channel, the seal engages the sill flange in response to the sash moving to the closed position; and a sealing block positioned within each of the jamb channels between the sill and a corresponding one of the left stile or the right stile, wherein engagement of the left and right stiles with the sealing blocks limits movement of the sash towards the sill, such that a gap is defined between the sill ledge and the lift rail in the closed position, the gap allowing fluid to flow between the sill ledge and the lower rail end.

19. The window frame assembly of claim 18, further comprising a sealing gasket positioned atop each of the sealing blocks within the jamb channel, wherein each of the left stile and the right stile engages the corresponding sealing gasket in the closed position.

20. The window frame assembly of claim 19, wherein each of the sealing blocks defines a top block surface and a bottom block surface, the top block surface supporting the corresponding sealing gasket, the bottom block surface resting on a sill ledge of the sill, a slope of the bottom block surface matching a slope of the sill.

* * * * *